US012642634B1

(12) United States Patent
Tevrizian

(10) Patent No.: US 12,642,634 B1
(45) Date of Patent: Jun. 2, 2026

(54) SUCTION APPARATUS AND SALIVA EJECTOR

(71) Applicant: Daniel Tevrizian, San Marcos, CA (US)

(72) Inventor: Daniel Tevrizian, San Marcos, CA (US)

( * ) Notice: Subject to any disclaimer, the term of this patent is extended or adjusted under 35 U.S.C. 154(b) by 0 days.

(21) Appl. No.: 19/262,168

(22) Filed: Jul. 8, 2025

(51) Int. Cl.
| | |
|---|---|
| *A61C 17/06* | (2006.01) |
| *A61C 17/08* | (2006.01) |
| *A61C 17/10* | (2006.01) |
| *A61C 17/12* | (2006.01) |

(52) U.S. Cl.
CPC ............ *A61C 17/096* (2019.05); *A61C 17/08* (2019.05); *A61C 17/092* (2019.05); *A61C 17/10* (2019.05); *A61C 17/125* (2019.05)

(58) Field of Classification Search
CPC ....... A61C 17/096; A61C 17/08; A61C 17/10; A61C 17/125; A61C 17/092
See application file for complete search history.

(56) References Cited

U.S. PATENT DOCUMENTS

| | | | | |
|---|---|---|---|---|
| 3,049,806 A | * | 8/1962 | Cofresi | A61C 17/08 |
| | | | | 433/93 |
| 4,260,378 A | * | 4/1981 | O'Neil | A61C 17/08 |
| | | | | 433/96 |

| | | | | |
|---|---|---|---|---|
| 5,460,524 A | * | 10/1995 | Anderson | A61B 1/24 |
| | | | | 433/93 |
| 6,213,772 B1 | * | 4/2001 | Costello | A61C 17/08 |
| | | | | 433/140 |
| 7,261,560 B2 | * | 8/2007 | Abo | A61C 17/08 |
| | | | | 433/91 |
| 7,300,401 B2 | * | 11/2007 | Patrickus | A61C 17/10 |
| | | | | 600/242 |

* cited by examiner

*Primary Examiner* — Yogesh P Patel

(74) *Attorney, Agent, or Firm* — Michael D. Eisenberg

(57) ABSTRACT

An apparatus comprising: (a) a proximal tube having a proximal portion connectable to a suction apparatus, and having at least two channels extending distally along respective longitudinal axes from the proximal portion and being in fluid communication from the proximal portion; and (b) two or more formable or rigid hollow distal tubes, each terminating in a porous extraction port, each of the distal tubes having a proximal section configured to be retained in a respective one of the channels of the proximal tube, wherein the distal tubes are in fluid communication with the proximal portion of the proximal tube when retained in the proximal channels of the proximal tube. Each porous extraction port is sized for placement within a buccal sulcus or a lingual sulcus of a subject and, wherein each porous extraction port comprises a central lumen in fluid communication with a respective distal tube.

18 Claims, 23 Drawing Sheets

504

(General Art)

(General Art)

1

SUCTION APPARATUS AND SALIVA EJECTOR

CROSS-REFERENCES TO RELATED APPLICATIONS

This application is a continuation-in-part U.S. application Ser. No. 19/087,623, filed on Mar. 24, 2025, which is of a continuation of U.S. application Ser. No. 17/399,537, filed on Aug. 11, 2021, which is a continuation of International Application No. PCT/US19/60007, filed Nov. 6, 2019, which is a continuation-in-part of U.S. application Ser. No. 16/272,109, filed Feb. 11, 2019, all of which are incorporated herein by reference in their entireties for all purposes.

FIELD OF THE INVENTION

The invention generally relates to apparatus adapted for ejection of material from the mouth of a dentistry patient.

BACKGROUND OF THE INVENTION

Dental procedures often require a patient's mouth, or a portion of a patient's mouth to be kept relatively dry and clean of debris. Typically, while a dental practitioner performs a procedure, an assistant wields a saliva ejector device having a formable tube with one distal opening that receives saliva and other debris from the patient's mouth. Periodically, the dental practitioner pauses the procedure, and then the assistant passes the ejector device across excess material accumulating in and around the patient's mouth. In some cases, the distal opening of the ejector device may be formed into a hook-like shape and placed into the patient's mouth without the aid of an assistant, or the patient may be asked to close her lips around the ejector device, temporarily holding it in place.

The usual requirement that an assistant occasionally pass the device around the interior of the patient's mouth may be interruptive and inefficient for both the dental practitioner and the patient. Furthermore, the alternation between accumulation and removal of material may keep the patient's mouth insufficiently dry for a particular procedure.

Alternatively, portions of a patient's mouth may be kept dry by use of dams, absorbents, or other means. Such solutions may be obtrusive, bulky, uncomfortable, and inadequate.

BRIEF SUMMARY OF EMBODIMENTS OF THE INVENTION

The present invention provides an apparatus adapted for improved ejection of material, e.g., saliva, from the mouth of a patient during a dental procedure, and related methods. The inventive apparatus may be alternatively referred to as a suction apparatus and saliva ejector. Generally, the inventive suction apparatus is designed to be connected to a suction/vacuum source and a waste collection container. The vacuum source provides the negative pressure to draw saliva and other debris from the oral cavity into the apparatus and eventually to the waste collection container.

An aspect of some embodiments of the present invention relates to a apparatus comprising a proximal tube and two or more formable or rigid hollow distal tubes. The proximal tube has a proximal portion adapted for connection to a suction and waste container apparatus, and has at least two channels extending distally along respective longitudinal axes from the proximal portion and being in fluid communication with the proximal portion. The two or more distal tubes each terminate in a respective porous extraction port at distal ends thereof, each of the distal tubes having a proximal section configured to be retained in a respective one of the channels of the proximal tube, wherein the two or more distal tubes are in fluid communication with the proximal portion of the proximal tube when retained in the channels of the proximal tube. Each porous extraction port is sized for placement within a buccal sulcus or a lingual sulcus of a subject, and each porous extraction port comprises a central lumen in fluid communication with one of the two or more distal tubes.

In a variant, each of the distal tubes is configured for being rotatable about the longitudinal axis of a respective one of the channels while retained in the channel.

In another variant, the distal tubes are removably joinable to the proximal tube.

In yet another variant, the distal tubes are interference fit to the proximal channel.

In a further variant, the at least two distal tubes are two distal tubes, the at least two channels are two channels, the longitudinal axes of the channels are parallel to each other, the two channels are in fluid communication latitudinally with each other, such that when the distal tubes are retained in the into the channels the proximal sections of the distal tubes touch each other and press against each other.

In yet a further variant, the proximal tube is configured to connect directly to the suction and waste container apparatus.

In a variant, the apparatus includes a connector removably joined to the proximal tube to connect the proximal tube to the suction and waste container apparatus.

In some embodiments of the present invention, the distal tubes are formable.

In a variant, the apparatus includes a bending tool configured to be used for bending at least one of the distal tubes to a desired shape.

The bending tool may include a base sheet, a first extension, a second extension, a third extension, and a fourth extension. The first extension is located at a proximal section of the base sheet, and extends perpendicularly to the base sheet, on a first surface of the base sheet. The second extension is located distally of the first extension, extends perpendicularly to the base sheet, on the first surface of the base sheet, and has a curved shape curving about an axis perpendicular to the first surface of the base sheet. The third extension extends perpendicularly to the base sheet, on the first surface of the base sheet, and extends laterally and proximally from the second extension. The fourth extension extends perpendicularly to the base sheet, on the first surface of the base sheet, and is located distally from a lateral end section of the third extension, such that a gap is present between the third extension and the fourth extension.

In a variant, the first extension has an open polygonal shape surrounding a cavity, the cavity being configured to receive any one of the extractor ports while a remainder of a respective one of the distal tubes extends outside the cavity via an opening of the polygonal shape.

In another variant, the at least one of the distal tubes has an intermediate section extending distally from the proximal section and a distal section extending distally from the intermediate section; the at least one of the distal tubes is bendable such that the proximal section extends along a first axis, the intermediate section has a first bend that curves toward the proximal section, followed by a second bend, such that the distal section extends distally from the second bend substantially perpendicularly to the first axis.

In a variant, at least one of the distal tubes is rigid. The at least one of distal tubes has an intermediate section extending distally from the proximal section and a distal section extending distally from the intermediate section. In the at least one distal tube, the proximal section extends along a first axis, the intermediate section has a first bend that curves toward the proximal section, followed by a second bend, such that the distal section extends distally from the second bend substantially perpendicularly to the first axis.

In another variant, the apparatus includes a flexible connection hose having a first end and a second end, the first end of the connection hose being configured to be joined to the proximal portion of the proximal tube and the second end of the connection hose being configured to be joined to the suction and waste container apparatus.

In some embodiment of the present invention, the apparatus includes a positioning plate configured to be removably joined to the proximal tube or to the distal tubes, distally from the proximal sections of the distal tubes when the proximal sections of distal tubes are retained in the channels of the proximal tube, the positioning plate being configured to contact the subject's head under the subject's jaw when in use.

In a variant, the positioning plate has an opening on an end thereof, for insertion of the distal tubes or of the proximal tube into the positioning plate and retention of the distal tube in the positioning plate.

In another variant, the at least two distal tubes are two distal tubes; the at least two channels are two channels; the opening comprises a longitudinal aperture on an end of the positioning plate and a latitudinal opening connected to the longitudinal opening, the longitudinal opening being configured for enabling insertion of the distal tubes into the positioning plate, and the latitudinal opening configured for grasping the distal tubes by the positioning plate following insertion of the distal tubes into the longitudinal opening and a turning of the positioning plate with respect to the distal tubes.

An aspect of some embodiments of the present invention relates to an apparatus comprising a proximal tube, two formable or rigid hollow distal tubes, and a connector. The proximal tube has a proximal portion adapted for connection to a suction and waste container apparatus, the proximal tube having two channels extending distally along respective longitudinal axes from the proximal portion and being in fluid communication with the proximal portion. The distal tubes each terminate in a porous extraction port at distal ends thereof, each of the distal tubes having a proximal section configured to be retained in a respective one of the channels of the proximal tube, wherein the distal tubes are in fluid communication with the proximal portion of the proximal tube when retained in the channels of the proximal tube. The connector is removably joined to the proximal tube to connect the proximal tube to the suction and waste container apparatus. Each porous extraction port is sized for placement within a buccal sulcus or a lingual sulcus of a subject, and wherein each porous extraction port comprises a central lumen in fluid communication with one of the two or more distal tubes. Each of the distal tubes is configured for being rotatable about the longitudinal axis of a respective one of the channels while retained in the channel. The distal tubes are removably joinable to the proximal tube. The distal tubes are interference fit to the proximal channel. The longitudinal axes of the channels are parallel to each other. The two channels are in fluid communication latitudinally with each other, such that when the distal tubes are retained in the into the channels the proximal sections of the distal tubes touch each other and press against each other. At least one of the distal tubes has an intermediate section extending distally from the proximal section and a distal section extending distally from the intermediate section. The at least one of the distal tubes is: bendable such that the proximal section extends along a first axis, the intermediate section has a first bend that curves toward the proximal section, followed by a second bend, such that the distal section extends distally from the second bend substantially perpendicularly to the first axis; or rigid and having the proximal section extending along a first axis, the intermediate section having a first bend that curves toward the proximal section, followed by a second bend, such that the distal section extends distally from the second bend substantially perpendicularly to the first axis.

In a variant, the distal tubes are formable, and the apparatus further comprises a bending tool configured to be used for bending at least one of the distal tubes to a desired shape, the bending tool comprising: a base sheet; a first extension at a proximal section of the base sheet, the first extension extending perpendicularly to the base sheet, on a first surface of the base sheet; a second extension located distally of the first extension, the second extension extending perpendicularly to the base sheet, on the first surface of the base sheet, the second extension having a curved shape curving about an axis perpendicular to the first surface of the base sheet; a third extension extending perpendicularly to the base sheet, on the first surface of the base sheet, the third extension extending laterally and proximally from the second extension; and a fourth extension extending perpendicularly to the base sheet, on the first surface of the base sheet, the fourth extension located distally from a lateral end section of the third extension, such that a gap is present between the third extension and the fourth extension. The first extension has an open polygonal shape surrounding a cavity, the cavity being configured to receive any one of the extractor ports while a remainder of a respective one of the distal tubes extends outside the cavity via an opening of the polygonal shape.

In yet another variant, the apparatus includes a positioning plate configured to be removably joined to the proximal tube or to the distal tubes, distally from the proximal sections of the distal tubes when the proximal sections of distal tubes are retained in the channels of the proximal tube, the positioning plate being configured to contact the subject's head under the subject's jaw when in use. The positioning plate has an opening on an end thereof, for insertion of the distal tubes or of the proximal tube into the positioning plate and retention of the distal tube in the positioning plate. The opening comprises a longitudinal aperture on an end of the positioning plate and a latitudinal opening connected to the longitudinal opening, the longitudinal opening being configured for enabling insertion of the distal tubes into the positioning plate, and the latitudinal opening configured for grasping the distal tubes by the positioning plate following insertion of the distal tubes into the longitudinal opening and a turning of the positioning plate with respect to the distal tubes.

In another aspect of some embodiments of the present invention, the invention provides an apparatus comprising (i) a proximal tube having a first diameter, wherein the proximal tube is rigid, semi-rigid, or formable and adapted on the proximal end for connection to a suction and waste container apparatus, and (ii) two or more distal tubes each terminating in a porous extraction port and each having a second diameter smaller than the first diameter, wherein the distal tubes are flexible and in fluid communication with the proximal tube, wherein the porous extraction ports are sized for placement within an oral cavity of a subject.

In another aspect, the invention provides an apparatus comprising (i) a first tube and a second tube each having a proximal end and a distal end, wherein the tubes are adapted on the proximal end for connection to a suction and waste container apparatus, (ii) a first flexible tube and a second flexible tube in fluid communication with and attached to the distal end of the first tube and the second tube, respectively, and (iii) a first porous extraction port and a second porous extraction port distal to and in fluid communication with the first flexible tube and second flexible tube, respectively, wherein the porous extraction ports are sized for placement within an oral cavity of a subject. Optionally, the apparatus further comprises a first rigid or semi-rigid elbow tube disposed between the first flexible tube and the first extraction port, and a second rigid or semi-rigid elbow tube disposed between the second flexible tube and the second extraction port. The first tube and the second tube may be rigid, semi-rigid, or formable. Optionally, the first tube and the second tube each comprise a bend in the distal half of the tube and positioned in a manner that, in use, the bend secures the apparatus over the mandibular arch and the extraction ports are configured to be positioned in the lingual and/or buccal sulci.

In some embodiments of the foregoing aspects, the extraction ports comprise a central lumen in fluid communication with the distal tubes. In some embodiments, the extraction ports comprise a cotton roll. In some embodiments, the extraction ports comprise tubes with side openings. In some embodiments, the extraction ports are sized for placement within a buccal sulcus or a lingual sulcus.

In some embodiments, the apparatus comprises two, three, four, or more extraction ports. In other embodiments, the apparatus comprises two, three, four, or more distal tubes.

In one aspect, the invention provides an apparatus (e.g., a saliva extractor) comprising (a) a Y-connector having a single vacuum input and a first and a second output, the outputs in fluid communication with the input, and the input adapted for connection to a vacuum source and waste container; (b) a first tube and a second tube each having a proximal end and a distal end, wherein the first and second tubes are adapted on their proximal ends for connection to the first and second outputs, respectively; and (c) a first and second extractor assembly in fluid communication with the first and second tubes, respectively, each comprising in proximal to distal order: a rigid or semi-rigid elbow configured to support the saliva extractor over the incisal edge of a subject; a flexible tube; and an extraction port comprising fenestrations configured to allow the passage of fluid into the extraction port interior and sized for placement within a buccal sulcus or a lingual sulcus of a subject.

In some embodiments, the Y-connector is configured to accept vacuum source tubes of only a single size. In other embodiments, the Y-connector is configured to accept vacuum source tubes of two, three, four, or more different sizes.

In some embodiments, the Y-connector contains a backflow prevention valve.

In some embodiments, the first and second elbow is detachably connected with the first and second tubes, respectively. Alternatively, the first and second elbow and the first and second tubes, respectively, are unitary elements (e.g., manufactured as a single element or manufactured as separate elements and subsequently fused).

In some embodiments of any of the foregoing aspects of the invention, the apparatus further comprises a tongue guard attached to an extraction port, wherein the tongue guard is configured to hold the tongue of a subject in a medial position relative to the extraction port. The tongue guard may be permanently affixed to the extraction port or may be slidably engaged in a longitudinal direction with the extraction port. If slidably engaged, in some embodiments, the tongue guard and extraction port may comprise complimentary detents and grooves adapted to hold the tongue guard in one of a plurality of longitudinal positions on the extraction port.

In some embodiments, the single vacuum input of the Y-connector is adapted to receive a vacuum input tube having a first diameter or a vacuum input tube having a second diameter, wherein the first diameter is larger than the second diameter.

In another aspect, the invention provides a method for extracting saliva from a subject's mouth comprising:

(a) providing the apparatus of any one of the foregoing aspects;

(b) placing a first extraction port in a lingual sulcus or a buccal sulcus;

(c) placing a second extraction port in a lingual sulcus or a buccal sulcus; and (d) applying a suction to the apparatus through the proximal tube, wherein the suction is sufficient to extract saliva from the subject's mouth through at least on of the extraction ports.

In some embodiments, the subject is a human or an animal. In other embodiments, the subject is a cat or a dog.

In some embodiments, one extraction port is placed in each lingual sulcus, one extraction port is placed in each buccal sulcus, or both. In another embodiment, one extraction port is placed in a buccal sulcus and another extraction port is placed in a lingual sulcus.

By "distal," when referring to the inventive device, is meant toward the patient and away from the suction source. For example, the distal end(s) of the inventive device are the material extraction ports that are placed within the patient's mouth.

By "flexible," when referring to a tube is meant one that has little to no linear rigidity and may be bent over a larger working range of angles than formable and semi-rigid tubes. Flexible tubes do not tend to return to a previous shape and do not readily maintain any particular shape and, therefore, do not add any significant structural support or rigidity to the device.

By "formable," when referring to a tube including, for example, the proximal tube, is meant a tube that is semi-rigid such that the user may deform or otherwise shape the tube without damage to the tube wall or loss of patency and wherein the tube retains the formed shape. For example, standard saliva extractors known in the art are formable in that the suction tube is manufactured in a linear configuration but the user (e.g., dentist) may bend the extractor to facilitate saliva extraction in hard-to-reach areas of the oral cavity and/or to provide light retraction of soft tissues such as the cheeks and lips.

By "proximal," when referring to the inventive device, is meant toward the suction source and away from the patient.

By "rigid," when referring to a tube is meant one that cannot be significantly bent or otherwise deformed without a substantial risk of damage to the tube wall and/or loss of patency, and wherein the tube will not retain a deformed shape after the deformation pressure is released.

By "semi-rigid," when referring to a tube is meant one that may be bent within a significant working range of angles without damage to the tube wall and/or loss of patency. Semi-rigid tubes may retain a deformed shape (i.e., also be "formable") or may return or have bias to return to its original (e.g., manufactured) shape.

By "vacuum source tube" is meant the most proximal vacuum line into which a disposable or autoclavable saliva extractor may be attached. A saliva extractor may be attached directly to the vacuum source tube or through an adapter. In some embodiments, the vacuum source is neither removable nor autoclavable and represents a fixed element that is used with multiple patients without substantial cleaning, sterilization, or replacement for each patient.

By "waste container apparatus" is meant a system which comprises a vacuum source (e.g., pump) and a waste collection container, as is typically used in dental and related procedures as described herein. Other tubing and fittings generally accompany the waste container apparatus in order to functionally connect that apparatus to the instrument (e.g., suction apparatus) used in the medical/dental procedure.

BRIEF DESCRIPTION OF DRAWINGS

The present invention may be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION OF THE EMBODIMENTS OF THE INVENTION

Figure 1:
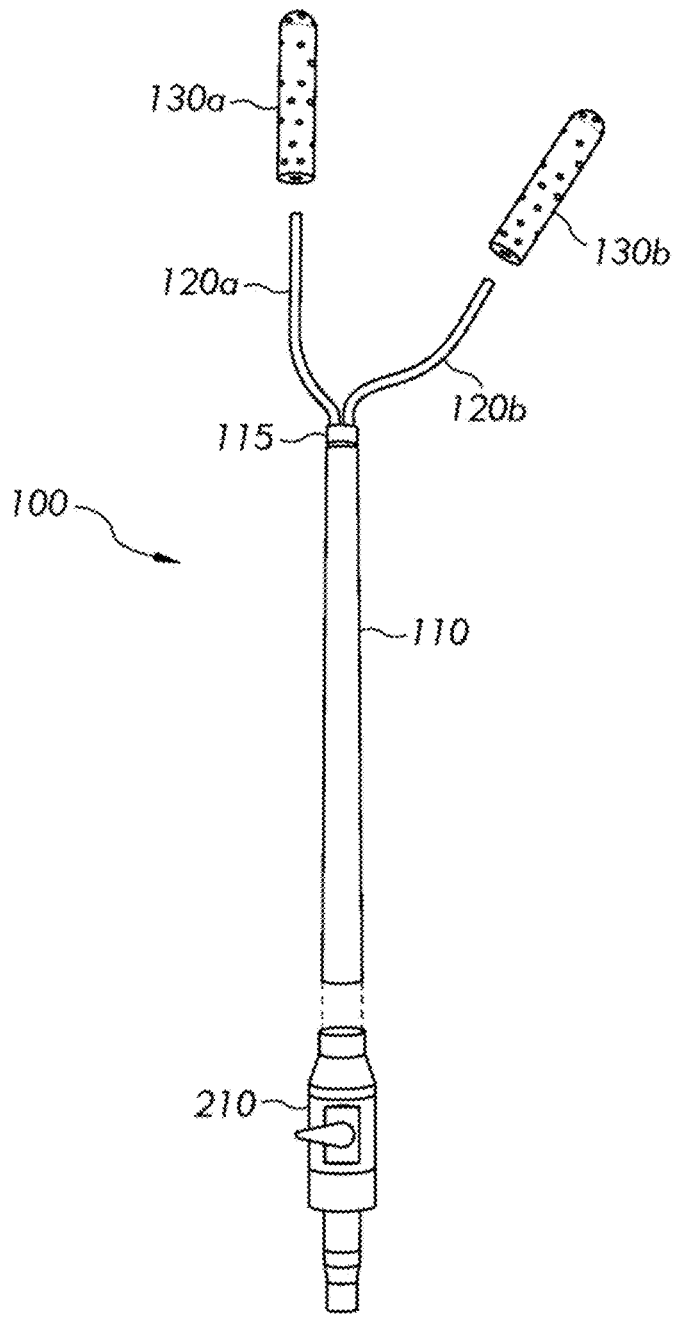
FIG. 1 is a schematic of a first implementation of a suction apparatus, according to some embodiments of the present invention.

The following description sets forth the invention and method of use in several embodiments. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

Saliva ejectors are commonly used by a dentist, dental hygienist, or other person of skill in the art who might require the removal of material such as saliva, blood, irrigation fluid (e.g., water), and other debris and fluid from a patient's oral cavity during a dental procedure. The present invention provides an improved saliva ejector having multiple extraction ports through which the unwanted/waste material (fluid) is removed by suction created by an external vacuum source (pump).

One purpose of the invention is to provide a saliva ejector having multiple extraction ports in order to more fully and efficiently remove unwanted fluids and debris from the oral cavity during a dental, medical, or surgical procedure. Generally, the ejector contains two extraction ports but it may be desirable to construct ejectors having three, four, or more extraction ports for use in certain procedures. Where the following descriptions refer to ejectors having two extraction ports, it is understood that additional extraction ports may be included for placement in other areas of the oral cavity. The extraction ports may be placed in any suitable location within the oral cavity and particularly in locations at which saliva and other fluids collect. For example, extraction ports may be placed into (i) the left and right lingual sulci, (ii) ipsilateral lingual sulcus and a buccal sulcus (e.g., the right lingual sulcus and right buccal sulcus or the left lingual sulcus and left buccal sulcus), (iii) contralateral lingual sulcus and a buccal sulcus (e.g., the right lingual sulcus and left buccal sulcus or the left lingual sulcus and right buccal sulcus), (iv) the left and right buccal sulci, and (v) higher order combinations thereof.

While in preferred embodiments, the suction apparatus is used to extract material from a human dental patient's oral cavity, the present invention is not necessarily limited to application in human dentistry patients and could be used in non-human dental applications and/or non-dental medical applications. The sizing, configuration, and positioning of the various elements may be varied as appropriate for the desired use without departing from the spirit and scope of the invention.

Another purpose of the invention is to provide a saliva ejector that stays in place by itself without the need for to be manually held in place. It is common practice during dental, medical, and surgical procedures within the oral cavity to for the clinician (e.g., surgeon or dentist) who is performing the procedure to be assisted by another individual (e.g., a dental hygienist, nurse, or other assistant), wherein the assistant is responsible for positioning and operating a saliva ejector. In many instances, the assistant is required to hold the saliva ejector for the entirety of the procedure, leaving the assistant unable or with reduced capacity to assist the clinician with the procedure. Accordingly, it is desirable to have a saliva ejector that may be positioned in various locations within the oral cavity and that does not require constant attention by an operator. Such a device would allow a clinician to perform certain procedures without an assistant and/or would free the assistant to perform other tasks required by the procedure.

Another purpose of the invention is to provide a hands-free tongue guard to obstruct the patient's tongue from other tools implemented within the oral cavity. Small mouth mirrors held by the clinician and/or assistant are typically used for this purpose, but these require continual manual manipulation. Accordingly, it is desirable to have a hands-free tongue guard that may be positioned within the oral cavity and that may free up the hands of the operators.

In various aspects, the inventive saliva ejector generally comprises two or more extraction ports attached directly or indirectly to flexible tubing which facilitates comfortable and secure placement of the extraction ports at the target locations within the oral cavity. The flexible tubing attaches to formable tubing which is bendable by the operator but holds its shape under normal usage conditions. The formable tubing is connected directly or indirectly to a vacuum pump that provides the suction required to draw the fluids and debris from the oral cavity through the extraction ports, and to a collection vessel (waste container) that traps the unwanted fluid and debris for later disposal.

FIG. 1 provides an exploded view of one implementation of suction apparatus 100, shown ex situ. Suction apparatus 100 comprises a proximal tube 110 and a pair of flexible or semi-flexible distal tubes 120 a, 120 b attached to and in fluid communication with distal end of proximal tube 110. While FIG. 1 depicts two distal tubes 120 a, 120 b, in some embodiments, there may be 2, 3, 4, or more distal tubes. The distal ends of distal tubes 120 a, 120 b terminate in, and are in fluid communication with material extraction ports 130 a, 130 b. Extraction ports 130, distal tubes 120, proximal tube 110 are in fluid communication and the proximal end of the proximal tube 110 is operationally coupled to a waste container (not shown) and vacuum source (not shown) that generates a negative gas pressure sufficient to drawn waste fluids and debris through extraction ports 130. In some embodiments, the waste container and vacuum source have a standard configuration as is commonly found in dental offices. For example, optional adapter 210 is adapted to connect suction apparatus 100 to suction and waste collections systems standard and common in dental offices.

Optionally, distal tubes 120 may be connected to proximal tube 110 through end cap 115. In this embodiment, end cap 115 forms a reversible or irreversible connection with proximal tube 110. Optionally, end cap 115 comprises a plurality of holes in a top surface equal to the number of distal tubes 120 connected to end cap 115, wherein distal tubes 120 extend in the distal direction through the holes. Distal tubes 120 may have a flange, stopper, or other form of flared proximal end in order to secure distal tubes 120 to end cap 115. Many types of connections are known in the art and are suitable for connecting distal tubes 120 to proximal tube 110 provided that patency is maintained. Typically, proximal tube 110 has a greater cross-sectional area (diameter) than any individual distal tube 120 or all distal tubes 120 collectively. Thus, one purpose and configuration of end cap 115 is to form a junction between a plurality of distal tubes 120 and proximal tube 110.

Figure 2:
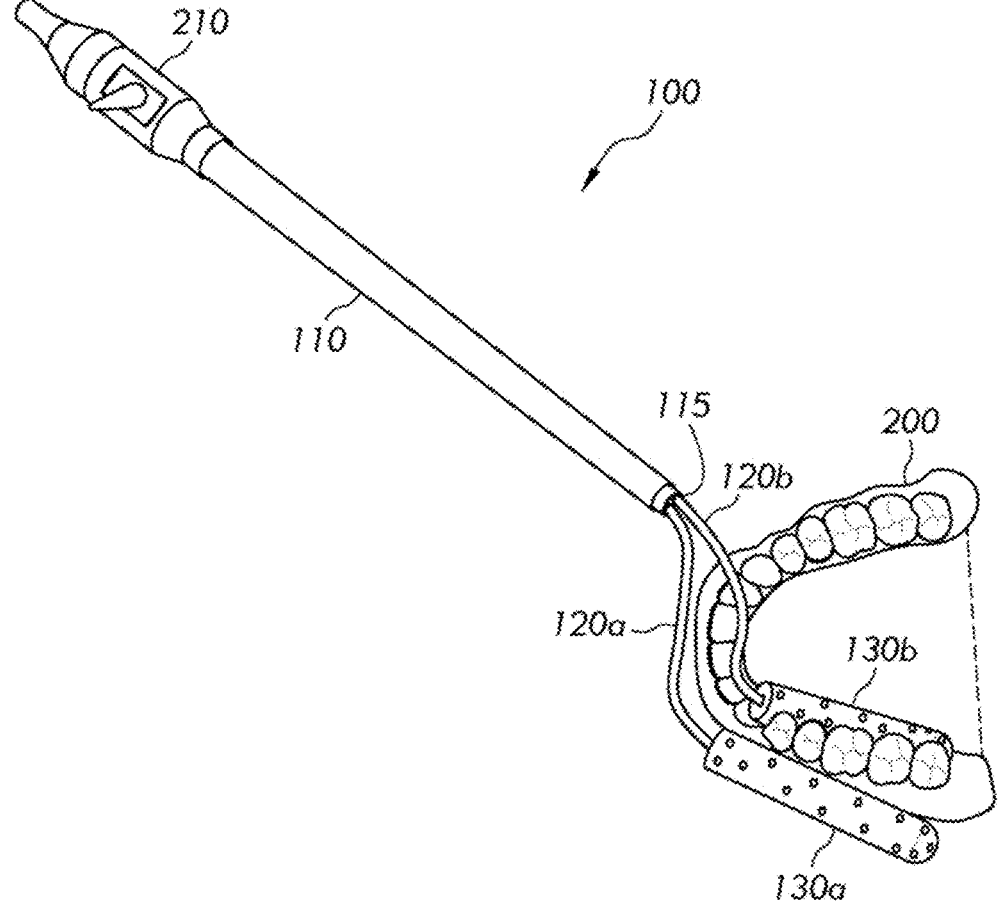
FIG. 2 is a perspective view of one exemplary placement of the material extraction ports on the buccal and lingual sides of a patient's mandibular arch, according to some embodiments of the present invention.

Proximal tube 110 and distal tubes 120 may be manufactured from any suitable material to any reasonable wall-thickness, diameter, and length. In some embodiment, the tubes are made from silicone, rubber, nylon, composite, polypropylene, PET, PTFE, and the like. In this implementation, distal tubes 120 are manufactured from a material and to specifications such that they may be easily and gently inserted into the patient's oral cavity, manipulated, positioned, arranged, adjusted, draped over the patient's mandibular arch, crimped, or removed. For example, FIG. 2 illustrates an exemplary placement of suction apparatus 100 along a patient's mandibular arch 200. Distal tubes 120 *a*, 120 *b* are freely movable so that the material extraction ports 130 *a*, 130 *b* may be placed in any desired location along the buccal sulci and/or lingual sulci. Suction apparatus 100 may be held in place simply by gravity and friction based on the positioning of the device on or against the patient. Optionally, an assistant may support suction apparatus 100 to ensure that material extraction ports 130 remain in the desired location within the oral cavity.

As shown in the exemplary placement in FIG. 2, the material extraction ports 130 *a*, 130 *b* are placed on the left buccal and left lingual sulci of the patient's mandibular arch 200. The suction apparatus 100 depicted in FIG. 2 has a proximal tube 110 fitted at its proximal end with an adapter 210 for fitting the suction apparatus 100 to standard dental suction units.

Figure 3:
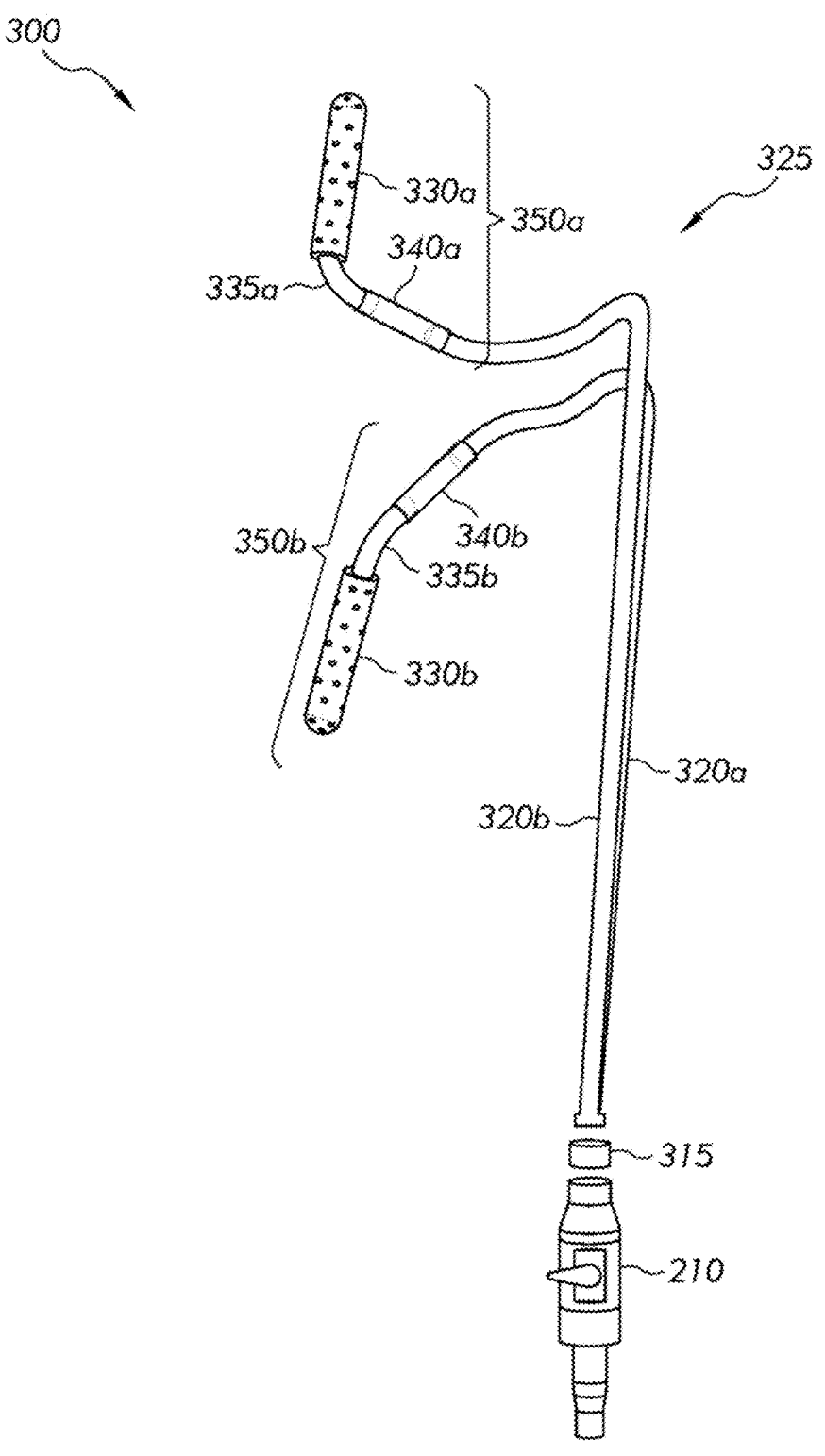
FIG. 3 is a schematic of a second implementation of a suction apparatus, according to some embodiments of the present invention.

FIG. 3 provides a perspective view of another implementation of suction apparatus 300 which eliminates the proximal tube and instead connects the plurality of distal tubes directly to the adapter and vacuum source line. As in the previous implementation, adapter 210 provides a connection between suction apparatus 300 and the vacuum source/waste container system (not shown) and, optionally, may provide a user-operated ball valve or similar device to regulate fluid flow and suction. Distal tubes 320 *a,b* are in fluid communication with and connected on their proximal ends to adapter 210. This connection may be direct or indirect. FIG. 3 illustrates that distal tubes 320 *a,b* are connected to adapter 210 through endcap 315. Alternatively or in addition to endcap 315, the connection may comprise a portion of proximal tube (not shown). The selection and design of the connection may be routinely varied based on the principles and requirements of design and end use.

FIG. 3 also illustrates an alternate configuration for the distal ends of the distal tubes with may be used with any of the suction apparati described herein. In this embodiment, distal tubes 320 *a,b* (with or without the presence of a proximal tube) are constructed from a rigid, semi-rigid, and/or formable material. A formable material is easily bendable by the user but retains its shape in use and under the weight of the device itself. The user is able to bend distal tubes 320 *a,b* at bend 325 to bridge the teeth and/or mandibular arch 200 and maintain the desired placement of extraction ports 330 *a,b* within the oral cavity. Distal tubes 320 may be manufactured to have a particular bend which may be unbendable or bendable by the user. Alternatively, distal tubes 320 may be manufactured in a linear or other convenient configuration of a bendable material such that the user can customize the bend and fit for each patient.

Distal tubes 320 *a,b* are connected directly or indirectly to extraction ports 330 *a,b*. Optionally, the connection is flexible in order to facilitate easy, secure, and comfortable placement of extraction ports 330 *a,b*. In one embodiment, suction apparatus 300 optionally comprises flexible connector 350 *a,b* that connects distal tubes 320 *a,b* and extraction ports 330 *a,b*, respectively. In one configuration, flexible connector 350 comprises, in proximal-to-distal order, flexible tube 340 and elbow 335 which connects distal tube 320 with extraction port 330. Elbow 335 may be rigid or semi-rigid, as necessary to facilitate placement and user comfort. In another embodiment, elbow 335 is omitted such that distal tube 320 is connected to extraction port 330 only through flexible tube 340.

Figure 4A:
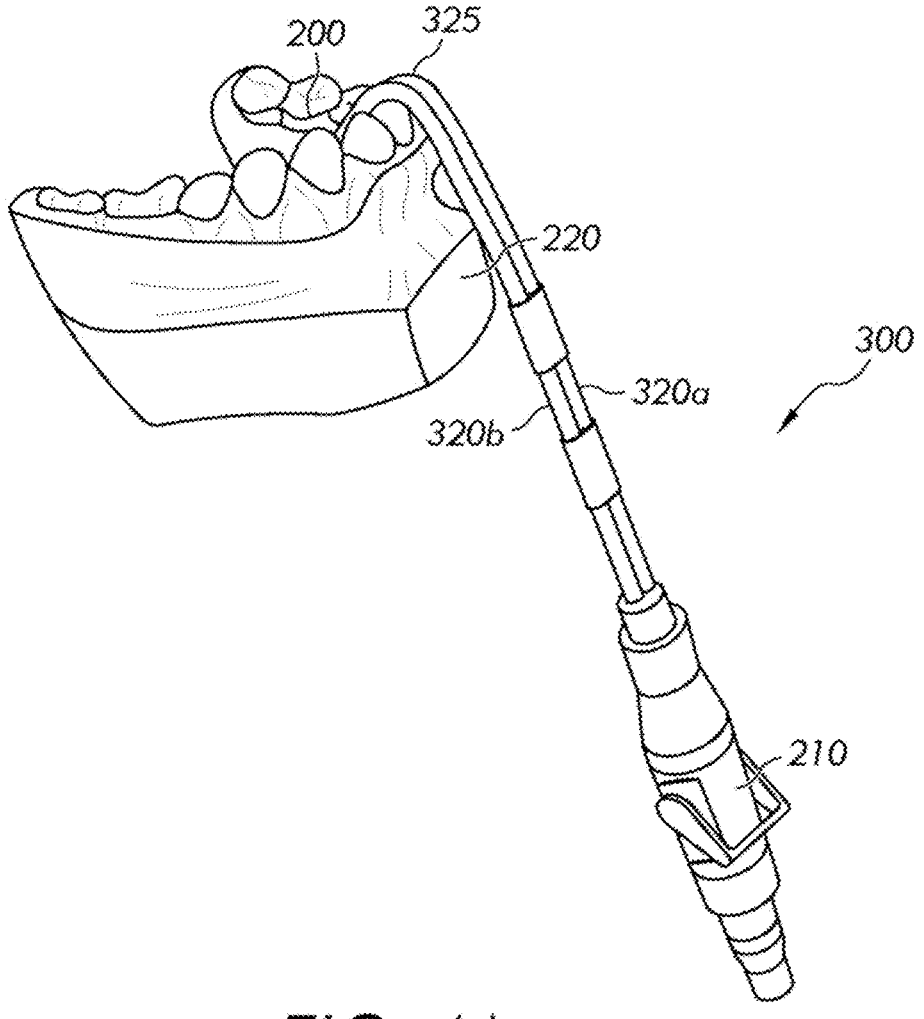
FIG. 4A is a schematic side view illustrating one possible positioning of the suction apparatus in relation to the lower mandible of a subject, according to some embodiments of the present invention.
Figure 4B:
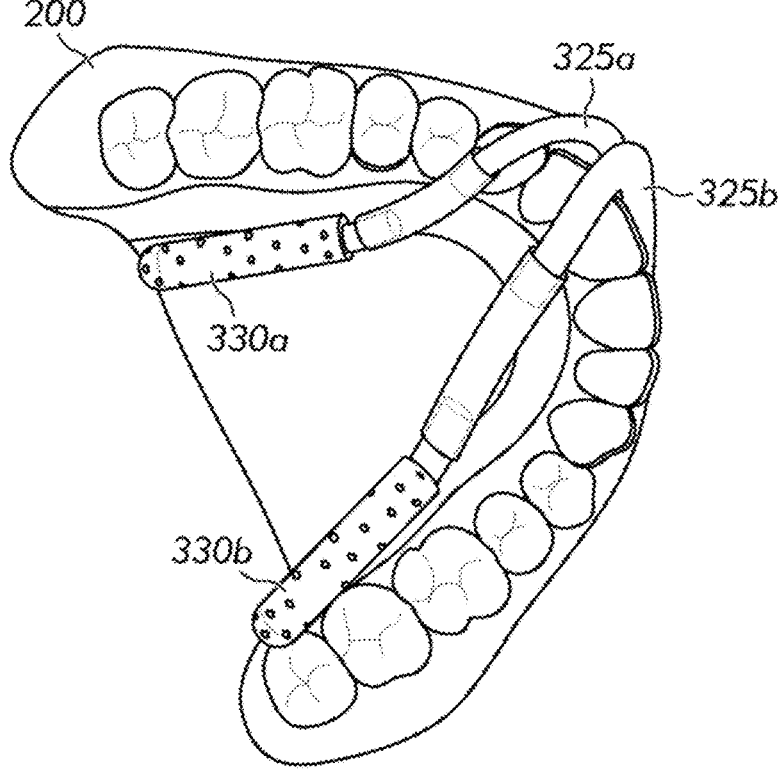
FIG. 4B is a schematic top view illustrating one possible positioning of the extraction ports relative to the lower mandible of a subject, according to some embodiments of the present invention.

FIG. 4A shows a side view of suction apparatus 300 bridging the lower mandibular arch 200. Specifically, distal tubes 320 *a,b* have bend 325 at a sufficient angle so as to maintain placement of extraction ports 330 *a,b* (not shown) at the desired location. It is understood that bend 325 generally will have a less acute angle because dental patients typically are reclined in a supine position. FIG. 4B shows a top view of the lower mandible 220 for the positioning shown in FIG. 4A. Extraction ports 330 *a,b* are shown as being positioned in the lingual sulci, however, one or both of extraction ports 330 *a,b* could be positioned in the buccal sulci wherein neither or only one of bend 325 *a,b* bridges the lower mandibular arch 200.

Figure 5:
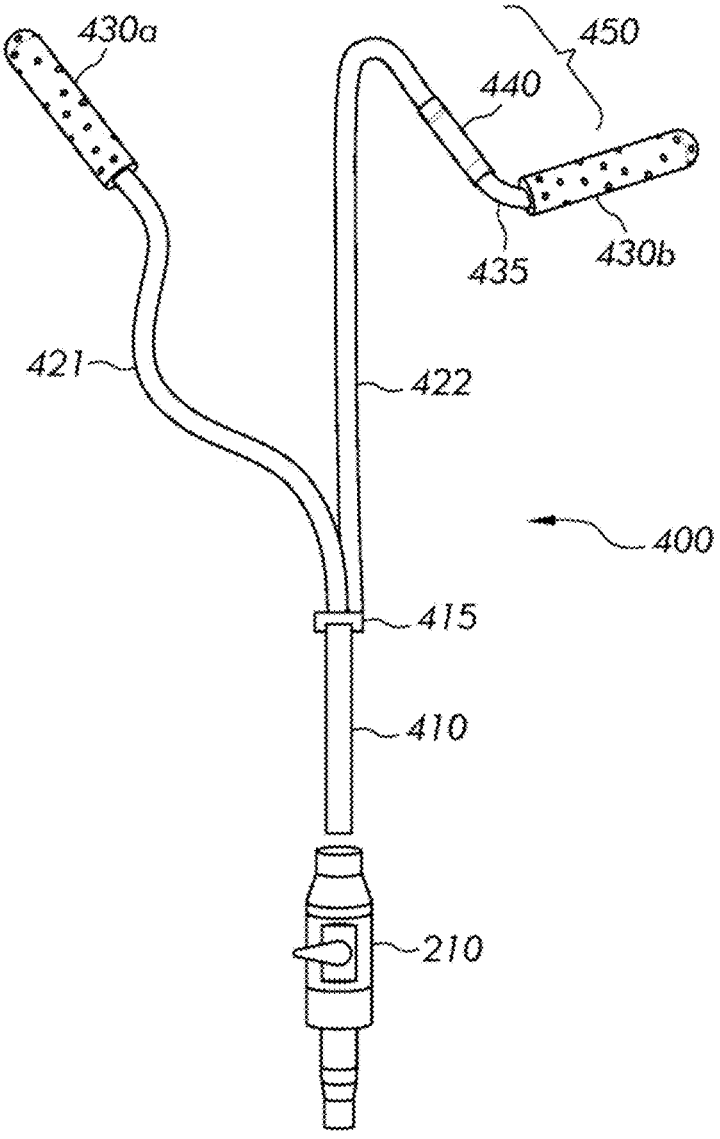
FIG. 5 is a schematic of a third implementation of a suction apparatus, according to some embodiments of the present invention.

Although the inventive suction apparati are illustrated and described herein as being symmetrical, it is understood that the two sides may be asymmetrical. For example, one side may have a longer tube length than the other side to facilitate placement of extraction ports 330 *a,b* in different bilateral locations. Furthermore, it is understood that the two sides need not have the same components and/or same arrangements. For example, FIG. 5 illustrates suction apparatus 400 in which one side has features of the first implementation and the other side has features of the second implementation. In this implementation, suction apparatus 400 comprises adapter 210, proximal tube 410, and end cap 415, as described above. First distal tube 421 is substantially the same as distal tubes 120 illustrated in FIG. 1 such that they are highly flexible and allow placement of extraction port 430 *a* in any location within the oral cavity. Second distal tube 422 is substantially the same as distal tubes 320 illustrated in FIG. 3 and optionally may include flexible connector 450 comprising elbow 435 and/or flexible tube 440. In some embodiments, distal tube 422 is sufficiently rigid to support the weight of suction apparatus 400.

Figure 6:
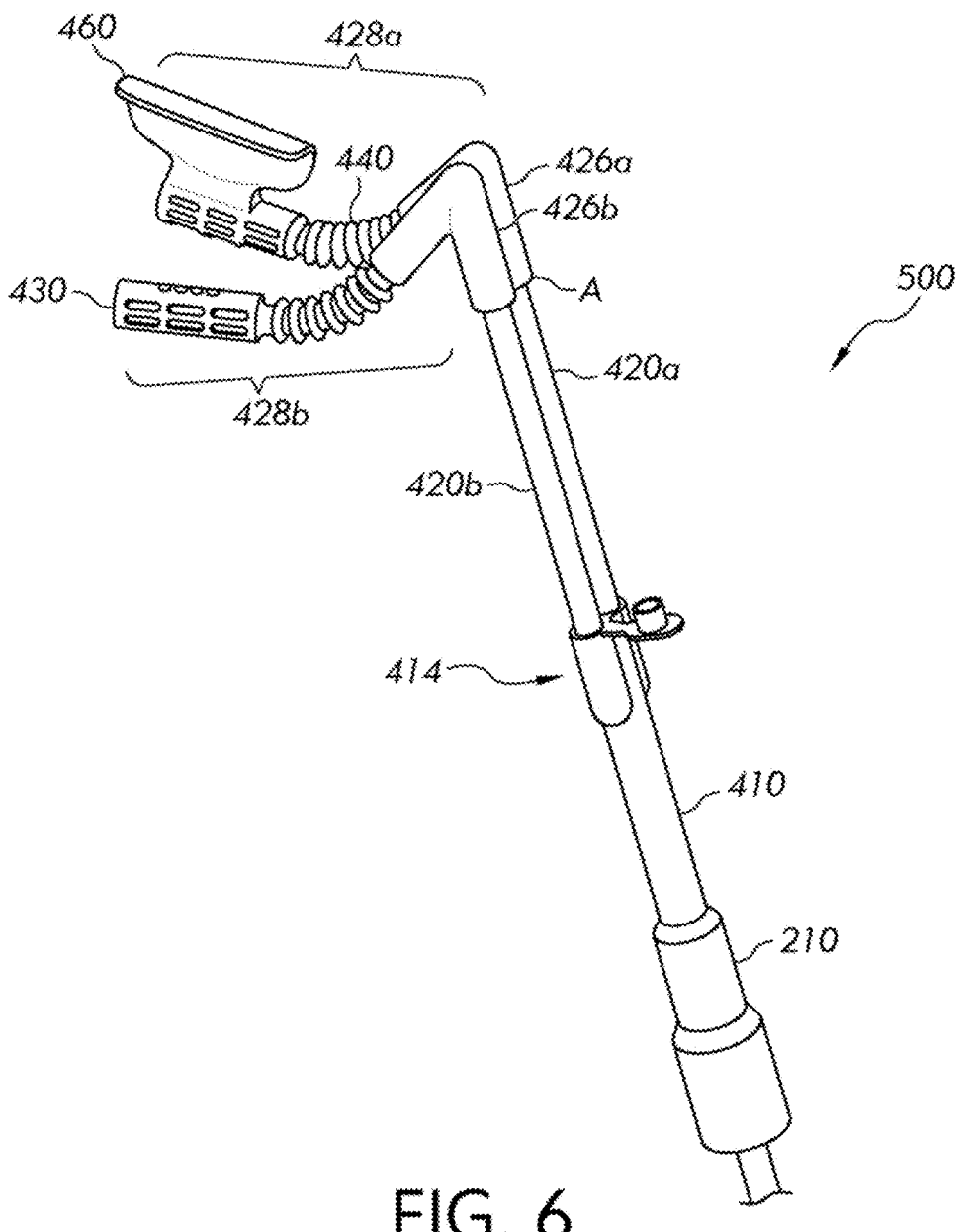
FIG. 6 is a schematic of a fourth implementation of a suction apparatus, according to some embodiments of the present invention.

FIG. 6 provides a perspective view of another implementation of suction apparatus 500. As in the previous implementations, adapter 210 provides a connection between suction apparatus 500 and the vacuum source/waste container system (not shown). Distal tubes 420 *a,b* are in fluid communication with and connected to adapter 210 through a Y-connector 414. Y-connector 414 is in fluid communication with the vacuum source (e.g., the vacuum source tube) either directly or indirectly. An indirect connection between Y-connector 414 and adapter 210 may be made, at least in part, through proximal tube 410. A direct connection is made when the Y-connector 414 is connected directly to adapter 210 or the vacuum source tube and proximal tube 410 is omitted. It is understood that Y-connector 414 and proximal tube 410 may be manufactured as separate elements and assembled prior to use. Alternatively, Y-connector 414 and proximal tube 410 may be manufactured as a single element in which the single vacuum input is extended to a convenient length for connection to adaptor 210 or vacuum source tube. The single vacuum input therefore functions equivalently to the proximal tube as the conduit between the adaptor 210 or vacuum source tube and the Y-junction of Y-connector 414. FIG. 6 illustrates an embodiment in which Y-connector 414 is configured to accept only a single size of proximal tube 410 and/or vacuum source tube. Y-connector 414 is described in more detail below.

As described above in the context of apparatus 300 (FIG. 4), distal tubes 320 *a,b* may have a rigid or semi-rigid bend in order to form the apparatus over the lower mandibular arch (e.g., the incisal edge) in order to aid placement of the extraction ports in the buccal and/or lingual sulci and, optionally, such that the apparatus is retained in place by "hanging" the bend over the incisal edge. FIG. 4 illustrates one embodiment in which bend 325 is formed in distal tubes 320 *a,b*. FIG. 6 illustrates an alternate embodiment in which each distal tube 420 *a,b* is substantially straight/linear and the affixed to distal apparatus 428 which includes elbows 426, flexible tubes 440, extraction ports 430, and an optional tongue guard 460. Each of these elements is described in more detail below.

One function of Y-connector 414 is to create two or more vacuum and/or fluid flow paths from the single vacuum line at the proximal end of the suction apparatus. In some embodiments, Y-connector 414 includes ports 417 *a,b* in fluid communication with the proximal end 416 and adapted to receive the proximal ends of distal tubes 420 *a,b* respectively. While FIGS. 6-7 show Y-connector 414 having two ports 417 *a,b*, Y-connector 414 may have three, four or more ports 417, each adapted to receive a proximal end of an associated distal tube 420.

In one embodiment, suction provided by the vacuum source/waste container system (not shown) to the proximal end 416 of Y-connector 414 is distributed evenly through the Y-connector 414 between ports 417 *a,b* resulting in an even distribution of suction between the extraction ports 430 *a,b*. In another embodiment, suction provided to the proximal end 416 is distributed unevenly through the Y-connector 414 to the ports 417 *a,b* resulting in an uneven distribution of suction between the extraction ports 430 *a,b*. In this case, one extraction port (e.g., 430 *a*) may provide a higher amount of suction than another extraction port (e.g., 430 *b*). The extraction port with the higher suction may be positioned in an area of the oral cavity where saliva or other fluid is expected to collect at a higher rate (e.g., in the lingual sulcus) while the extraction port with the lesser amount of suction may be positioned in an area where less saliva is expected (e.g., in the buccal sulcus).

As described in the context of FIG. 6, Y-connector 414 may form the junction between distal tubes 420 and proximal tube 410 or the junction between distal tubes 420 and adapter 210 (or vacuum source tube) if proximal tube 410 is absent. Y-connector 414 includes a distal end adapted to receive two or more distal tubes and a proximal end 416 adapted to receive the distal end of proximal tube 410 (or the distal end of adapter 210 or the vacuum source tube if proximal tube 410 is omitted). Y-connector 414 may be removed from proximal tube 410 (or adapter 210) and distal tubes 420 *a,b* to be cleaned, sterilized (e.g., autoclaved) and/or replaced. Y-connector 414 may be attached to proximal tube 410 (and/or adapter 210) and distal tubes 420 *a,b* via frictional fit, pressure fit, threaded unions, detents and/or other attachment mechanisms.

Figure 7B:
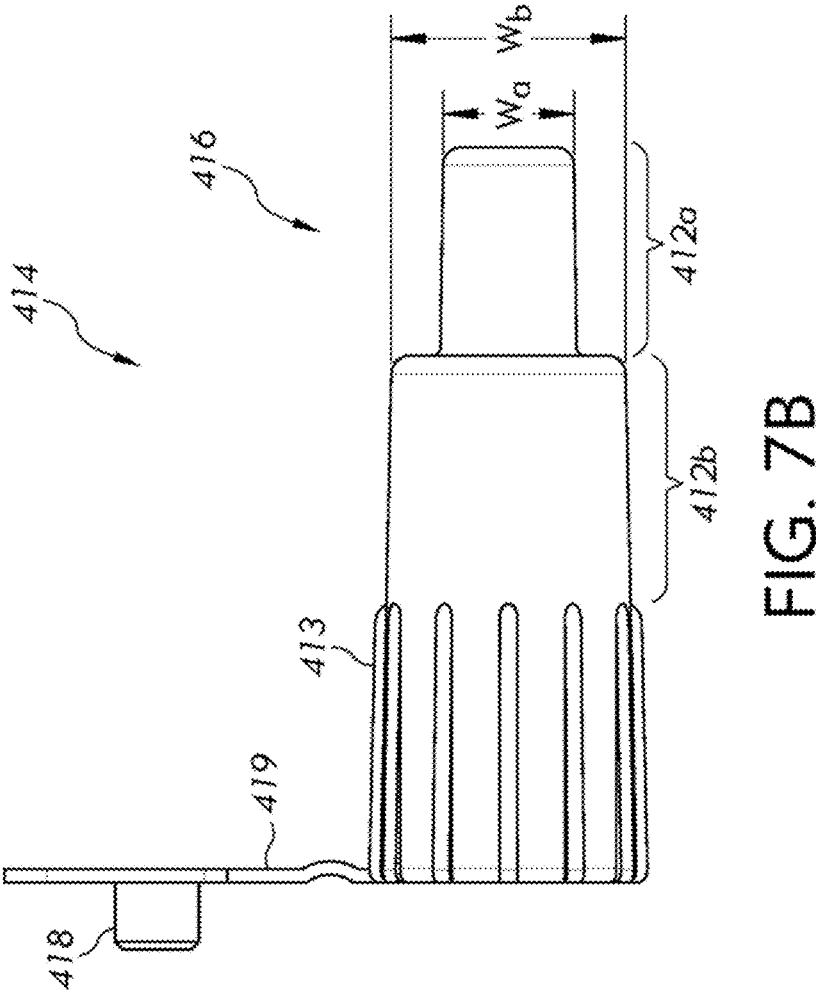
FIG. 7B is a side view of that Y-connector embodiment, according to some embodiments of the present invention.
Figure 7A:
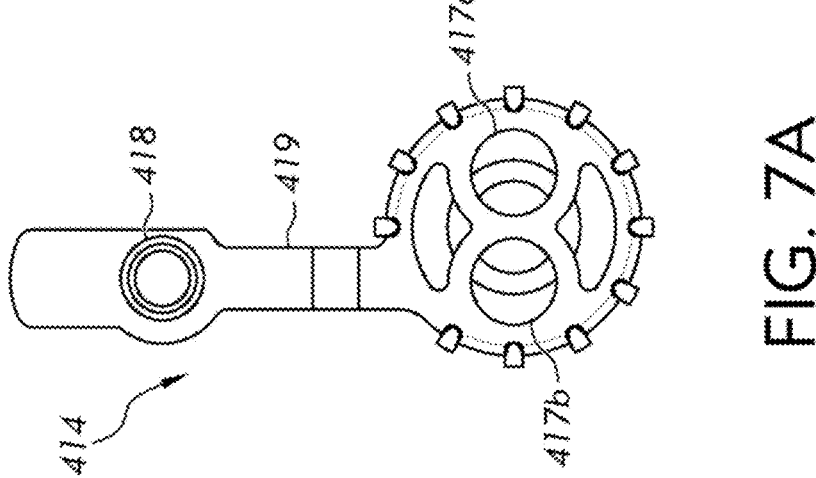
FIG. 7A is a longitudinal view of one embodiment of a Y-connector, according to some embodiments of the present invention.

Dentists' chairs often are equipped with two vacuum source tubes, wherein the first suction line providing a lower amount of suction and comprising a smaller diameter tubing, and the second suction line providing a higher amount of suction and comprising a larger diameter tubing. These suction lines may attach to adapter 210, proximal 410, or attach directly to the proximal end 416 of Y-connector 414. FIGS. 7A-7B show a perspective view of an alternate configuration of Y-connector 414 which is adapted to accept vacuum source tubes having one of two different sizes (internal diameters). In this embodiment, proximal end 416 is adapted to engage either the first suction line or the second suction line (either/or but not both at one time). To do so, proximal end 416 includes two input connector portions 412 *a,b*, with the first input connector portion 412 *a* adapted to receive the first suction line (with a smaller diameter) and the second input connector portion 412 *b* adapted to receive the second suction line (with a larger diameter). Input connector portion 412 *a* comprises a cylindrical adapter of width W$_a$ that generally corresponds to the inner diameter of the first suction line, and input connector portion 412 *b* comprises a cylindrical adapter of width We that generally correspond to the inner diameter of the second suction line. First and second input connection portions 412 *a,b* may each receive first and second suction lines respectively and be secured thereto by pressure fit, friction fit or by other attachment mechanisms. In some embodiments, Y-connector 414 includes longitudinal side ribs 413 or another structural feature that acts as a stop to the second suction tube (of larger diameter) when configured with the second input connector portion 412 *b*. The ribs 413 also may facilitate easier gripping of Y-connector 414 during attachment or general handling. The step junction between portions 412 *a* and 412 *b* may act as a stop to the first suction tube (of smaller diameter) when configured with the first input connector portion 412 *a*

In some dental procedures, it may be advantageous use fewer than all of the ports provided on the Y-connector. For example, the clinician may wish to begin the procedure with a single saliva extractor and then add a second saliva extractor during the procedure. One advantage of the inventive saliva extractor is modularity which provides the clinician with flexibility in extractor design without requiring separate extractor devices. Such flexibility may be provided by the Y-connector. In one embodiment, Y-connector 414 includes port plug 418 adapted to plug one of ports 417 *a,b* when only one extraction port 430 is in use. For example, one port (e.g., port 417 *b*) may be plugged using port plug 418 while another port (e.g., endcap port 417 *a*) may be configured with distal tube 420 *a* (and associated extractor port 430 *a*). In this way, suction provided by the vacuum source/waste container system (not shown) to Y-connector 414 is only applied through the unplugged port (e.g., port 417 *a*) to the extractor port 430 *a*. Port plug 418 may be flexibly connected to Y-connector 414 using port plug tab 419 to secure it to suction apparatus 400 when not in use. Where Y-connector 414 includes more than two ports 417, additional port plugs 418 may be provided as needed.

Figure 8:
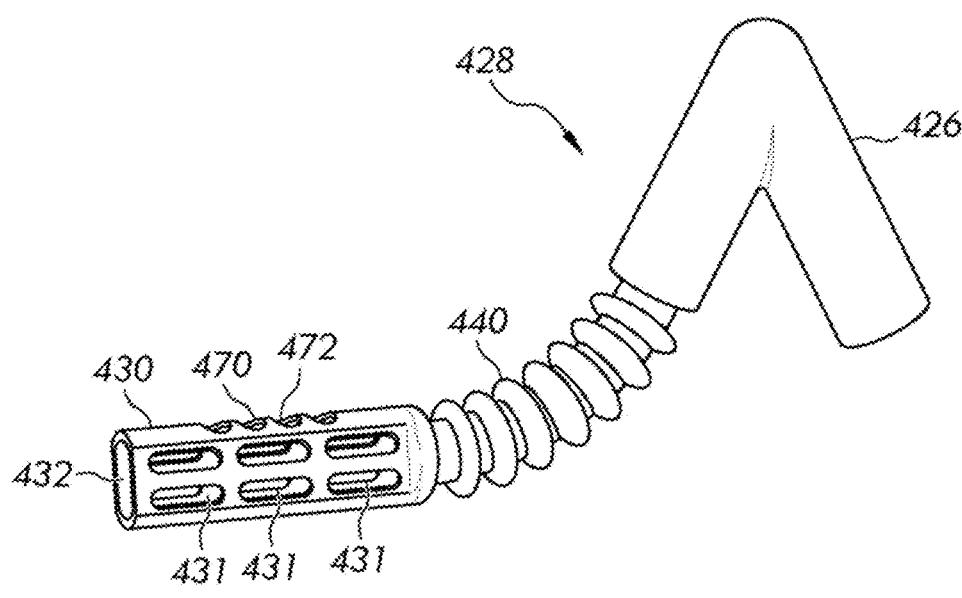
FIG. 8 is a schematic of a detachable elbow in combination with a flexible tube and an extraction port, according to some embodiments of the present invention.

FIG. 8 shows a perspective view of distal apparatus 428 which comprises, in proximal to distal order, detachable elbow 426, flexible tube 440, and extraction port 430. Each component may be separately manufactured and then assembled, two components may be manufactured as a single piece and then assembled with the third, or the distal apparatus 428 may be manufactured as a single piece. It is understood that other manufacturing and assembly configurations are possible including, for example, elbow 426 may be manufactured as part of distal tube 420 and then assembled with flexible tube 440 and extraction port 430.

As with bend 325 in other embodiments, elbows 426 *a,b* each include a bend at a sufficient angle to bridge the mandibular arch 200 so as to maintain proper placement of extraction ports 430 *a,b* within the oral cavity. Elbows 426 *a,b* may be rigid or semi-rigid as necessary to facilitate placement and user comfort. In some embodiments, elbows 426 are detachable from distal tubes 420, flexible tube 440, or both. Elbows 426 with different angles may be provided and interchanged depending on the angles needed for a particular patient and the desired positioning. Thus, in some embodiments the invention provides systems containing a plurality of elbows 426 (or matched pairs of elbows 426) having different angles, lengths, and/or tube sizes (outer and inner diameters) that may be interchanged by the user for each particular application or patient. Flexible tubes 340 may be formed to help facilitate proper placement of extraction ports 430 *a,b*. In one embodiment, flexible tubes 340 *a,b* include circumferential ribs (see FIG. 8) to allow tubes 340 *a,b* to bend while providing strength to avoid collapsing when flexed. In another embodiment, flexible tubes 340 are adapted to be cut to the desired length by the user and to connect to either extractor port 430 or distal tube 420 after being cut.

FIG. 8 illustrates an alternative configuration for extraction port 430 that may be used with any of the embodiments described herein. Extraction port 430 comprises a hollow tube having an internal diameter approximately the same as that of the tube immediately proximal to which it is connected; flexible tube 440 in this case. It is understood that the internal diameter of extraction port 430 may be slightly larger or smaller, as desired. The side walls of extraction port 430 comprise a plurality of fenestrations 431 that are sufficiently large to allow the passage of fluid and small particulate matter. The fenestrations may have any convenient shape or number. It is desirable that extraction port 430 maintain a high level of rigidity. Extraction port 430 in FIG. 8 is formed from a rigid plastic which allows for the combined area of the fenestrations to be at least about 30%, 40%, 50%, 60%, or more of the outer surface area. Optionally, the end wall is open or sealed. FIG. 8 illustrates an embodiment having an open end wall. Extraction port 430 also comprises detents 470 and slots 472 on the outer surface of at least one side but preferably two (opposite) sides, or all sides. As discussed in more detail below, detents 470 and slots 472 are adapted to hold tongue guard 460 or other apparatus having matching detents and slots.

Figure 9:
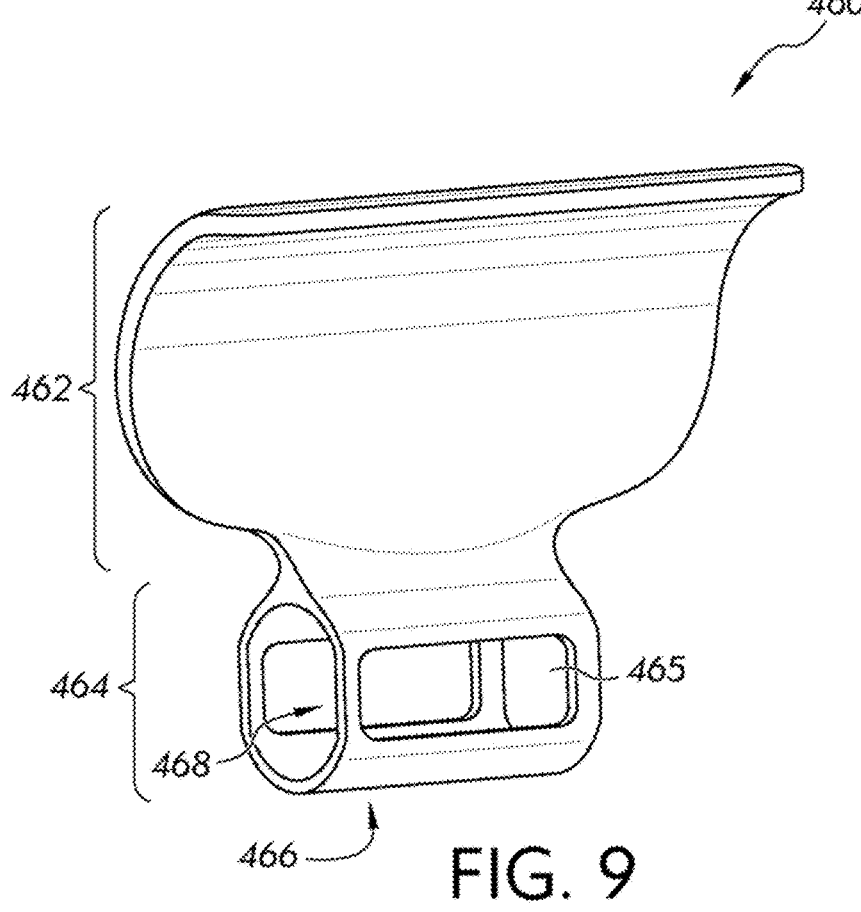
FIG. 9 is a schematic of a tongue guard, according to some embodiments of the present invention.

FIG. 9 shows a perspective view of tongue guard 460 which is intended to hold the tongue in a medial position and away from the lateral operating field (e.g., the teeth). Tongue guard 460 includes a guard portion 462 adapted to generally block the patient's tongue from other dental instruments implemented within the patient's oral cavity (e.g., a dental drill), and an attachment portion 464 adapted to attach the tongue guard 460 to an extraction port 430. Guard portion 462 generally comprises a thin wall that extends upward from attachment portion 464 *a* sufficient distance to obstruct the patient's tongue and to prevent accidental nicking of the tongue's lateral border by other dental tools. Guard portion 462 may have a length that is shorter, about the same, or longer than the length of extraction port 430. Generally, guard portion 462 is concave to tongue side for patient comfort. In some embodiments, guard portion 462 and/or tongue guard 460 is symmetrical so that the device may be positioned on either side of the mouth. In one implementation, the guard portion 462 is about 1.125 inches long, however other lengths also may be used.

The attachment portion 464 includes receptacle 466 with through-opening 468 adapted to receive an extraction port 430 from either side. The inner circumferential cross-section of through-opening 468 corresponds to the outer circumferential cross-section of the extraction port 430 so that the extraction port 430 may be received longitudinally into through-opening 468 and held therein. Depending on the placement of the associated extraction port 430 (e.g., whether the port 430 is positioned within the patient's left lingual sulcus or right lingual sulcus) the tongue guard 460 may be oriented on the extraction port 430 with its curvature arching to the right or the left respectively (towards the tongue).

Figure 10:
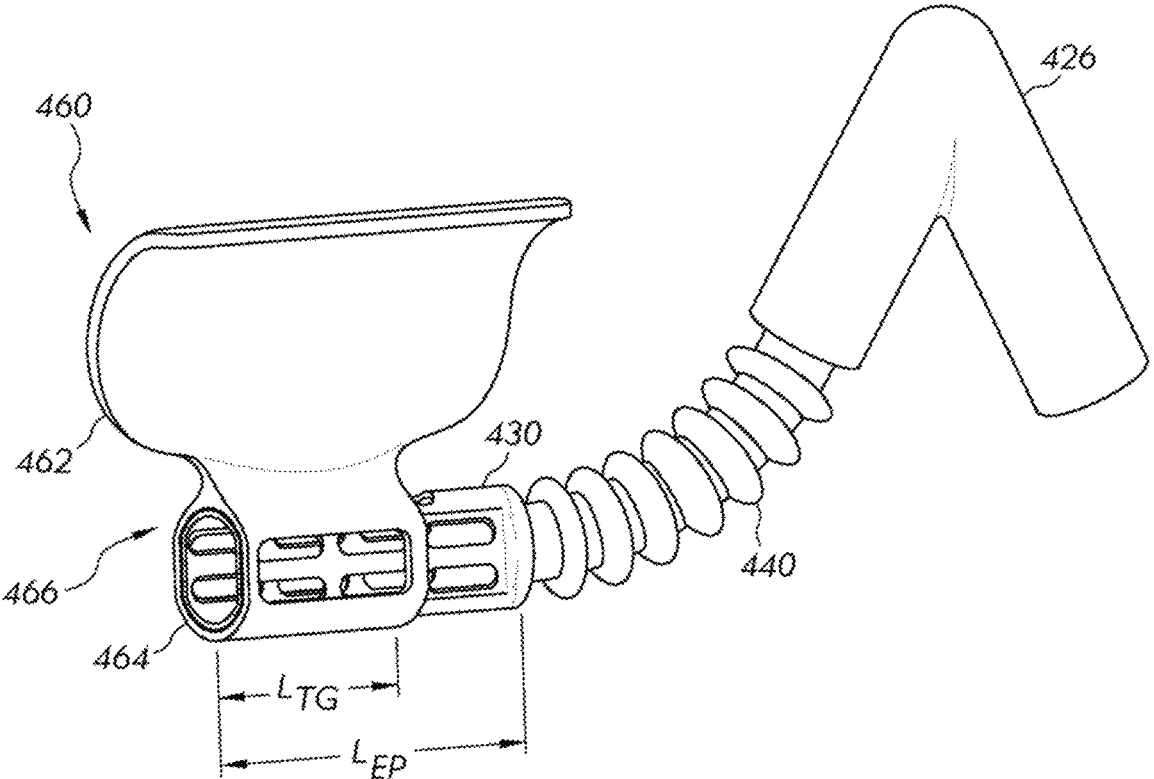
FIG. 10 is a schematic of a tongue guard in combination with a detachable elbow, a flexible tube and an extraction port, according to some embodiments of the present invention.

Through-opening 468 and extraction port 430 may include corresponding geometric elements (e.g., straight side walls as shown in FIGS. 8-10) that prevent receptacle 466 from rotating about the longitudinal axis of extraction port 430. The inner wall of through opening 468 also comprises a complimentary engagement system to that present on the outer surface of extraction port 430. As illustrated here, the attachment system comprises detents 470 and slots 472. In some embodiments, tongue guard 460 is slidably engaged with extraction port 430 to facilitate proper and convenient positioning within the subject's mouth. The inclusion of a slidable but reversible engagement system (e.g., detents 470 and slots 472) advantageously securely locks tongue guard 430 into the desired location but also allows for repositioning, removal, and/or reversal during the procedure.

Attachment portion 464 further comprises fenestrations 465 to allow the passage of fluid and debris though fenestrations 431 of extraction port 430. Fenestrations 465 may or may not match fenestrations 431 but usually do not. As illustrated in FIG. 9, attachment portion 464 comprises fewer but larger fenestrations 465 than fenestrations 431.

FIG. 10 illustrates an assembled distal apparatus 428 comprising a tongue guard 460. The longitudinal length $L_{TG}$ of tongue guard receptacle 466 may be less than the longitudinal length $L_{EP}$ of extractor port 430. This feature also allows tongue guard 460 to be slidably placed at different positions along the length $L_{EP}$ of extractor port 430 depending on its area of need within the oral cavity. In one implementation, extractor port 430 includes detents 470 and/or slots 472 on its outer circumferential surface (e.g., on its top surface as shown in FIG. 8) and receptacle 466 includes corresponding slots and/or detents on its inner circumferential surface (e.g., on its inner top surface (not shown)). With the receptacle 466 and extractor port 430 configured, the detent-slot combinations may mate to releasably secure receptacle 466 at a desired location on extractor port 430. It is preferable that the detent-slot combinations adequately hold receptacle 466 (and the overall tongue guard 460) in its position on extractor port 430 during use of the suction apparatus 400, and that tongue guard 460 may be removed from the extractor port 430 without excessive force when desired.

In one implementation, the detent-slot combinations are configured to hold the receptacle 466 at selectable positions along the extractor port 430 such as (without limitation): (i) with its distal end flush with the distal end of the extractor port 430 (as shown in FIG. 10), (ii) at a position 0.083 inch in from the flush position, (iii) at a position 0.167 inch in from the flush position and (iv) at a position 0.250 inch in from the flush position. It is understood that the detent-slot combinations may be placed at any desired location(s) along the extractor port 430 to secure the receptacle 466 thereto.
Proximal Tube and Adapter A proximal tube as described herein provides a fluid connection at its proximal end with a suction source and contains and directs fluid and debris entering the suction apparatus through the extraction ports. The proximal tube may be substantially rigid, formable, semi-flexible, or flexible. It may comprise any standard high-volume evacuator (HVE), saliva ejector (SE), or aspirator tubing. The inner-bore diameter may range from ⅛" up to 2". The proximal tube may have any suitable wall thickness. The proximal tube may be smooth, corrugated, coiled, or any combination thereof, and may be substantially straight, curved, L-shaped, or in any other suitable linear configuration. The proximal tube may be made from extruded vinyl, silicone, polyvinyl-chloride (PVC), nylon, or other suitable tubing material. In some embodiments, the proximal tube is made from biodegradable materials such as plant-based polymers, paper, and bamboo.

The adapter 210 may be any suitable dental tubing coupler. For example, adapter 210 may be threaded or unthreaded; may have a "quick disconnect" barb insert fitting; and/or may have a flow-adjust and/or shutoff valve. The adapter may comprise PVC, nylon, steel, brass, aluminum, or other suitable material or combination of materials. Adapter 210 may be substantially straight, L-shaped (i.e., "elbow"), or otherwise angled. The adapter 210 may be rigid or may have a swivel joint or ball-and-socket joint.

Material Extraction Ports

Distal tubes are in fluid communication at their distal ends with the material extraction ports. The material extraction ports are sufficiently porous to permit saliva and other oral fluids and, optionally, small particulate debris to pass from the oral cavity into the distal tubes. In some embodiments, the porosity of the extraction ports is small enough such that oral tissues (e.g., tongue, cheek, lips, etc.) are not trapped by suction, thereby causing discomfort to the patient and impeding the extraction of saliva. Extraction ports may comprise any convenient shape and suitable porous material. In preferred embodiments, material extraction ports 130 are substantially cylindrical and have a greater diameter than that of the distal tubes. In some embodiments, extraction ports are manufactured from cotton rolls having a central bore in fluid communication with the distal ends of distal tubes.

Material extraction ports may be of substantially uniform composition, or may optionally be perforated, i.e., disposed with a series of holes along the surface to permit increased flow of gases and fluids. Thus, material, e.g., saliva, flows through the nap and/or surface holes and into the distal tubes, down into the proximal tube, and then may be collected or discarded as waste. Alternatively, the material extraction ports may have 1, 2, 3, 4, or more additional holes of any suitable size or location on the surface for receiving material from a patient's oral cavity.

In some embodiments, the material extraction ports comprise a solid cap fitting over the distal end of the distal tubes the caps having a variously-shaped openings, e.g., circular, cross-shaped, star-shaped, polygonal, etc., over the opening to the lumens of the distal tubes.

Figure 11:
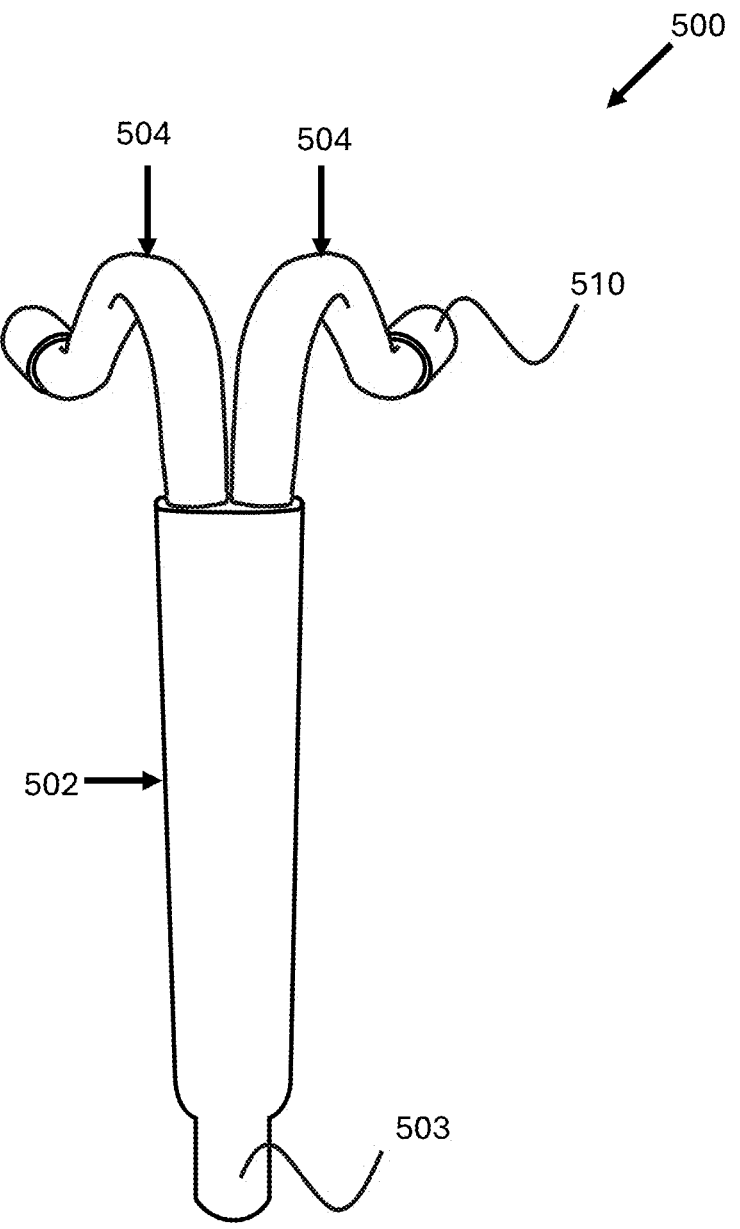
FIG. 11 illustrates an apparatus with rigid or formable distal tubes, according to some embodiments of the present invention.
Figures 12, 13, 14, 15:
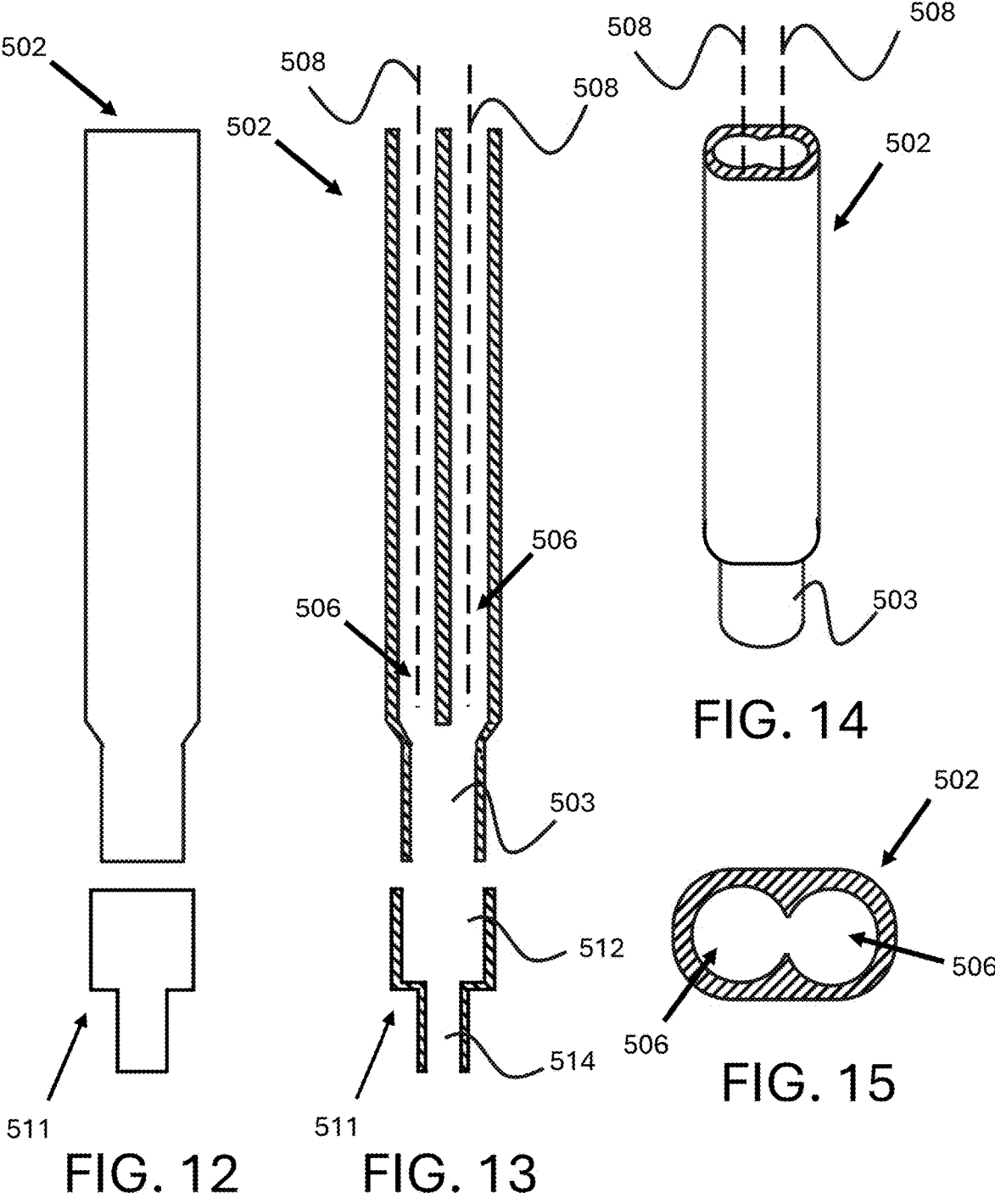
FIG. 12 is a side view of a proximal tube and a connector, according to embodiments of the present invention.
FIG. 13 is a side cross-sectional view of the proximal tube and the connector, according to embodiments of the present invention.
FIG. 14 is a perspective view of the proximal tube according to embodiments of the present invention.
FIG. 15 is a top view of the proximal tube, according to embodiments of the present invention.

FIG. 11 illustrates an apparatus with rigid or formable distal tubes, according to some embodiments of the present invention. FIG. 12 is a side view of a proximal tube and a connector, according to embodiments of the present invention. FIG. 13 is a side cross-sectional view of the proximal tube and the connector, according to embodiments of the present invention. FIG. 14 is a perspective view of the proximal tube according to embodiments of the present invention. FIG. 15 is a top view of the proximal tube, according to embodiments of the present invention.

The apparatus 500 is similar to the apparatus of FIGS. 3, 4A, and 4B described above. The apparatus 500 includes a proximal tube 502, and two or more formable or rigid hollow distal tubes 504.

The proximal tube 502 has a proximal portion 503 and at least two channels 506. The proximal portion 503 is adapted for connection to (and fluid communication with) a suction and waste container apparatus (not shown). The channels 506 extend distally from the proximal portion 503 along respective longitudinal axes 508. The channels 506 are in fluid communication with the proximal portion 503.

The distal tubes 504 each terminate in a respective porous extraction port 510 at distal ends thereof. Each distal tubes 502 has a proximal section configured to be retained in a respective channel 506 of the proximal tube 502. The distal tubes are hollow and either rigid or formable. The distal tubes 504 are in fluid communication with the proximal portion 503 of the proximal tube 502 when retained in the channels 506 of the proximal tube 502.

Each porous extraction port 510 is sized for placement within a buccal sulcus or a lingual sulcus of a subject, as explained above. Again, as explained above, each porous extraction port 510 includes a central lumen in fluid communication with the respective distal tubes. Via this fluid communication, each porous extraction port 510 is in fluid communication with the proximal portion 503 of the proximal tube 502 and therefore in fluid communication with the suction and waste container apparatus.

The distal tubes 504 may removably joinable to the proximal tube 502. In some embodiments of the present invention, the distal tubes 504 are retained by the respective channels 506 by interference fit.

As seen in the embodiments of FIGS. 14 and 15, In some embodiments of the present invention, the two distal tubes 504 and two channels 506 are present. The longitudinal axes 508 of the channels 506 are parallel to each other, and the two channels 506 are in fluid communication latitudinally with each other, such that when the distal tubes 504 are retained in the into the channels 506, the proximal sections of the distal tubes 504 touch each other and press against each other.

The proximal 502 may be configured to connect directly to the suction and waste container apparatus, or the apparatus may include a connector 511 removably joined to the proximal tube 502 to connect the proximal tube 502 to the suction and waste container apparatus. The connector 511 has a first section 512 having a cross section for connecting to the proximal portion 503 of the proximal tube 502 and a second section 514 having a cross section for connecting to the suction and waste container apparatus.

Figure 28:
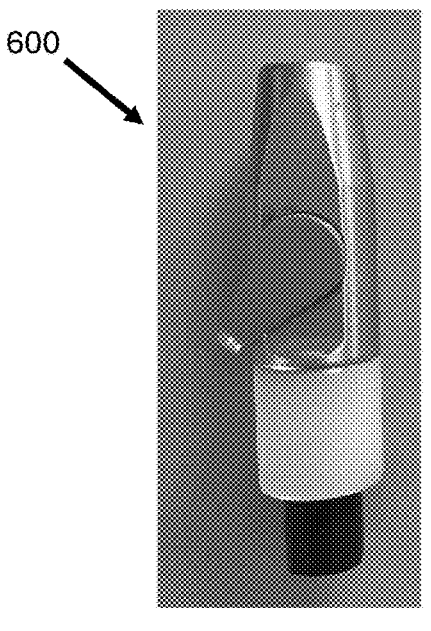
FIG. 28 is high-volume ejector (HVE) line connected to a suction apparatus, as known in the general art.
Figure 30:
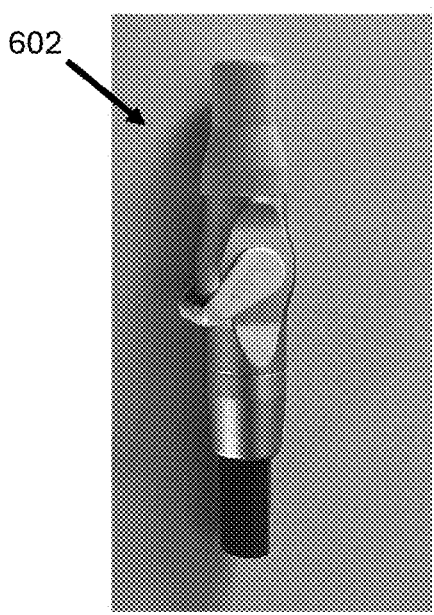
FIG. 30 is a low volume saliva ejector line connected to a suction apparatus, as known in the general art.
Figure 29:
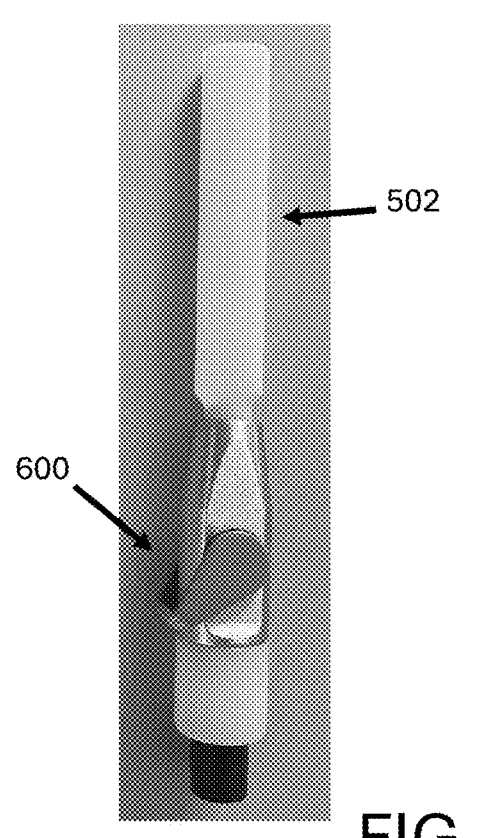
FIG. 29 illustrates the proximal tube of the present invention connected to the HVE line.
Figure 29:
Figure 31:
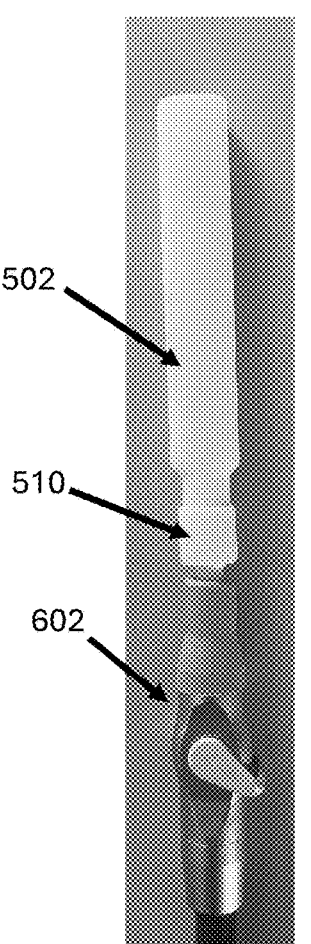
FIG. 31 illustrates the proximal tube of the present invention connected to the low volume saliva ejector line via a connector that is removably joined to the proximal tube.

Some suction apparatuses known in the general art include two suction mechanisms: a high-volume ejector (HVE) line 600 (FIG. 28) and a low volume saliva ejector line 602 (FIG. 30). The HVE line 600 has a larger cross-section than the low volume saliva ejector line 602. Thus, the removable connector 511 enables selectable connection to the HVE line 600 (when removed from the proximal tube 502, as seen in FIG. 29) and to the low volume saliva ejector line 602 (when joined to the proximal tube 502, as seen in FIG. 31).

Figure 16:
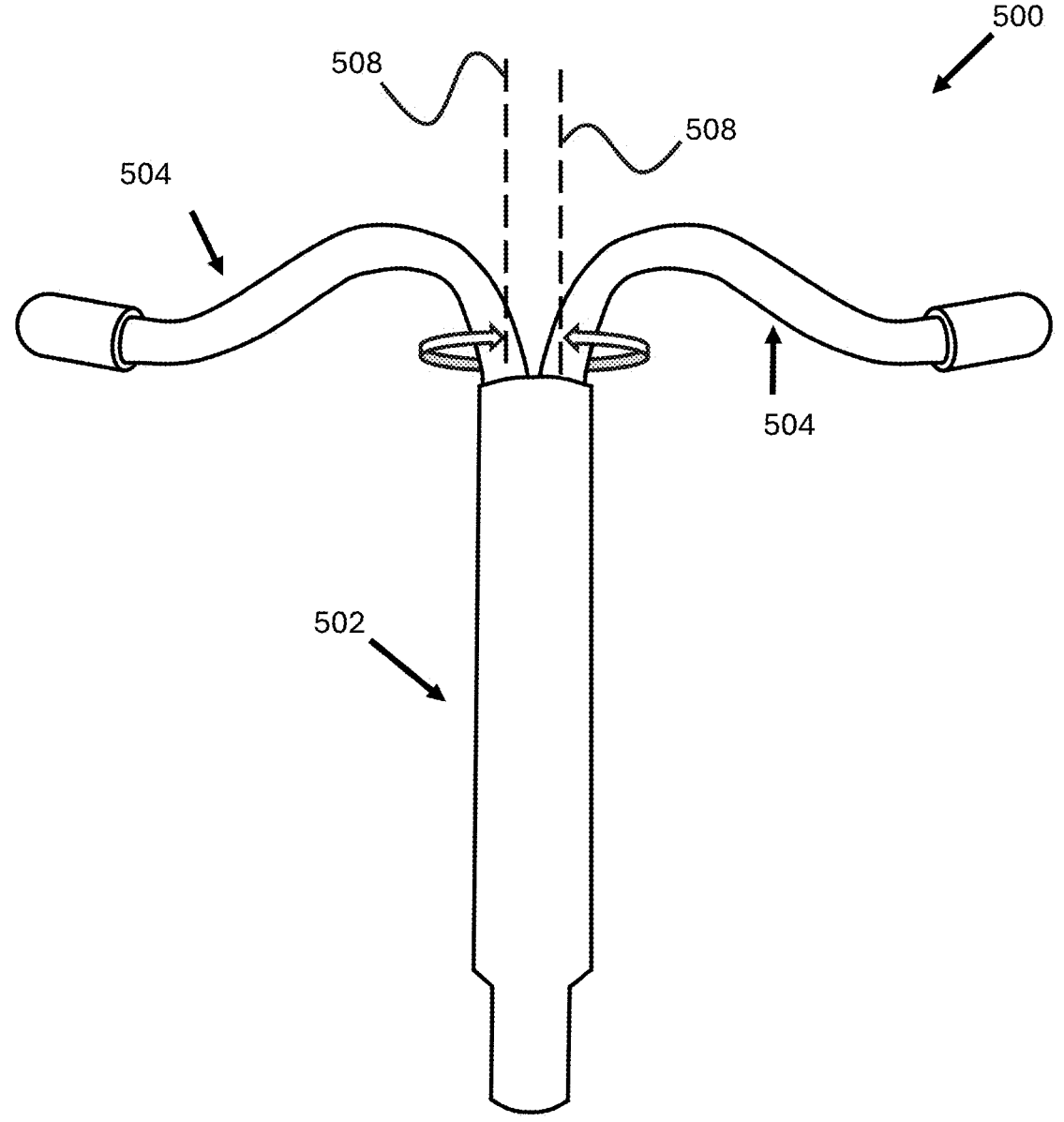
FIG. 16 illustrates an apparatus of the present invention, with the distal tubes rotatable with respect to the proximal tube while joined to the proximal tube.
Figure 17:
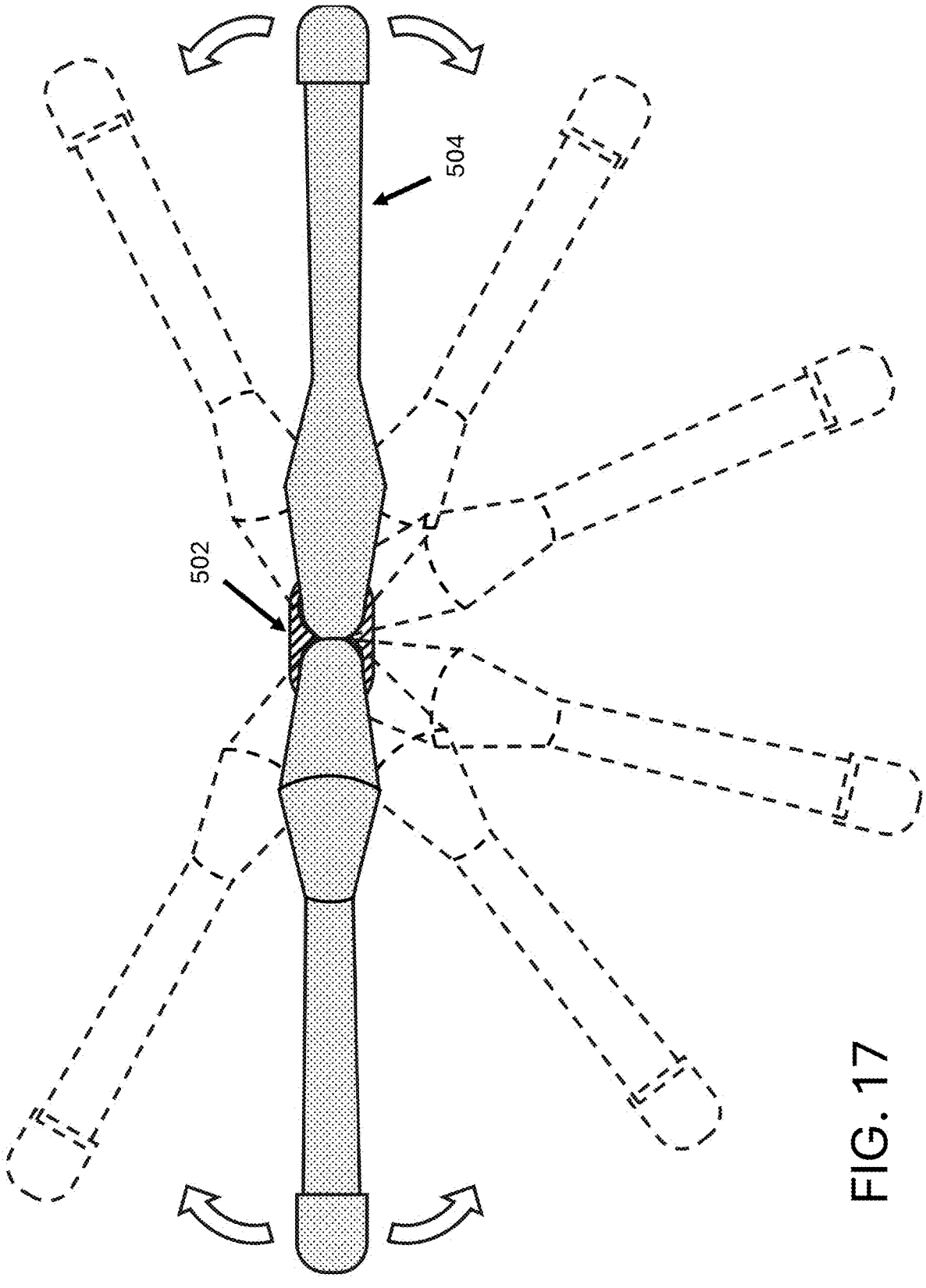
FIG. 17 is a top view of the apparatus of the present invention, showing non-limiting examples of different angles at which the distal tubes may be oriented, according to embodiments of the present invention.

FIG. 16 illustrates an apparatus of the present invention, with the distal tubes rotatable with respect to the proximal tube while joined to the proximal tube. FIG. 17 is a top view of the apparatus of the present invention, showing non-limiting examples of different angles at which the distal tubes may be oriented while joined to the proximal section 502, according to embodiments of the present invention.

Figure 26:
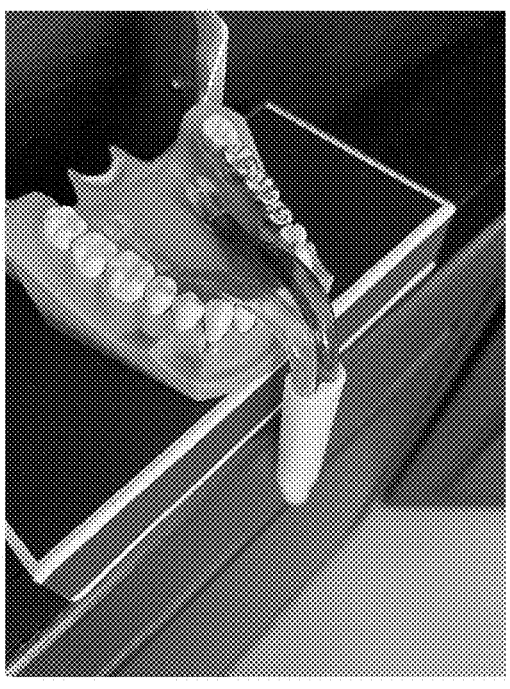
FIGS. 26 and 27 illustrate examples of positions of the apparatus of the present invention relative to a mouth.
Figure 27:
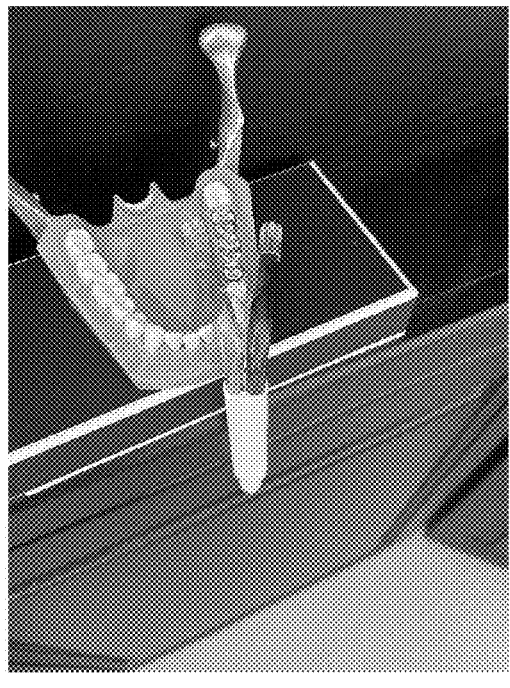

In some embodiments of the present invention, each the distal tubes 504 is configured for being rotatable about the longitudinal axis 508 of a respective one of the channels while retained in the channel. This feature enables enhanced control on the positioning of the extraction ports in the user's mouth as seen in FIGS. 26 and 27, where the angle between the two distal tubes is varied to better achieve a desired placement in the mouth. For example, in FIG. 26, the distal tubes are oriented so that the extraction ports abut both sides of the gumline while being on the lingual side of the gumline. In FIG. 27, the distal tubes are oriented such that one extraction port abuts the gumline at the lingual side of the gumline while the other extraction port abuts the same gumline at the buccal side. The angle between the distal tubes in FIG. 26 is larger than the angle between the distal tubes in FIG. 27. Therefore, the rotatability of the distal tubes enables adjustment of the positioning of the extraction ports.

Figures 22, 23, 24:
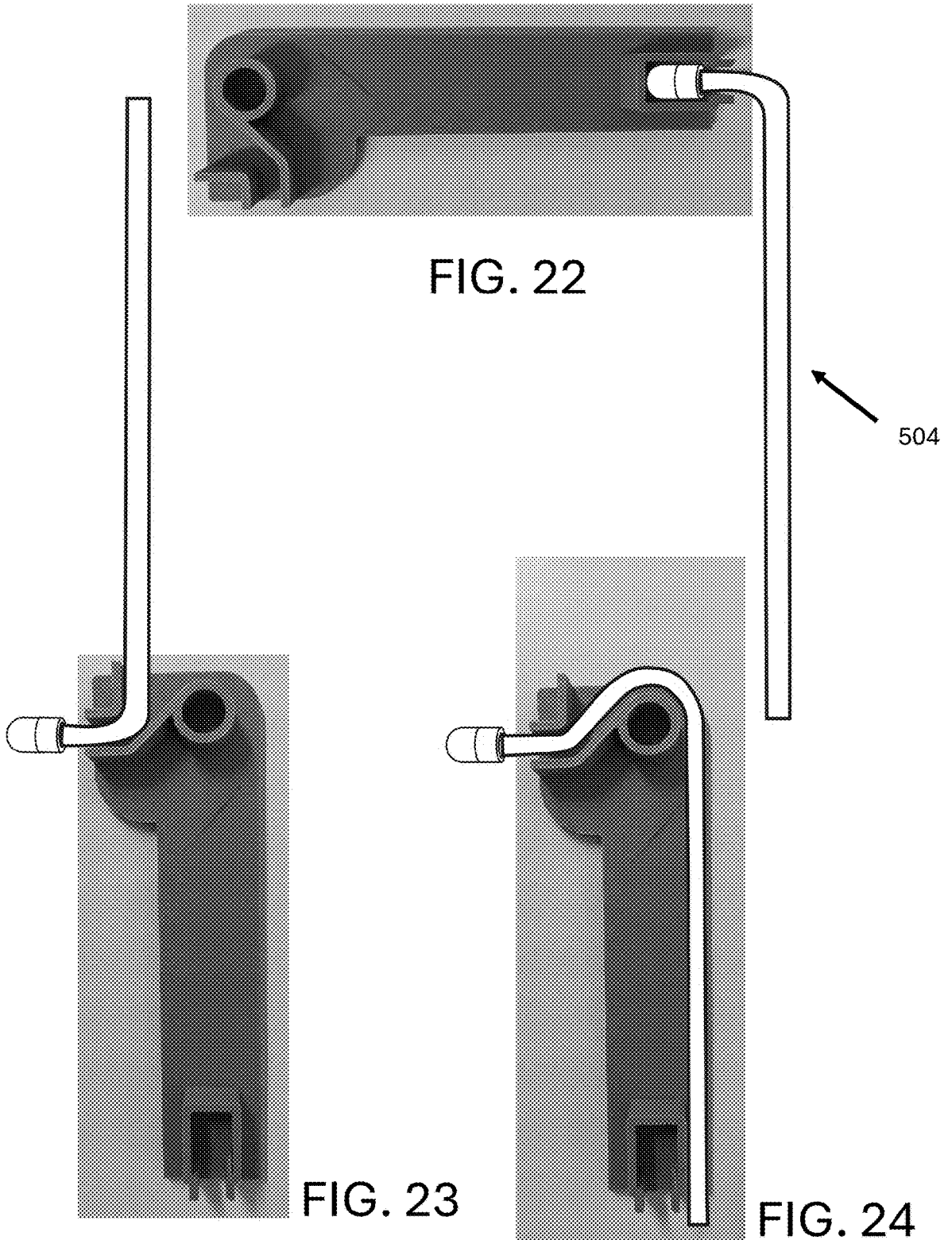
FIGS. 22-24 illustrate stages of bending a formable distal tube using the bending tool, according to a second process of some embodiments of the present invention.

FIG. 22 illustrates a side cross section of a distal tube clearing the user's tooth line such that the extraction port in a patient's mouth, according to embodiments of the present invention.

Whether the distal tubes are formable or rigid, it can be advantageous to have at least one of the distal tubes shaped to extend outside the mouth from the chin 700 to the lower lip 702, the enter the mouth by bending and clearing the tooth line 704, to reach and extend along the mouth floor 706. In this manner, the apparatus of the present invention is supported by the user's mouth and does not need a dentist or an assistant to hold the distal tube(s) to ensure that the extraction port is in the desired position.

Thus, in some embodiments of the present invention at least one of the distal tubes 504 has an intermediate 504b section extending distally from the proximal section 504a (which is inside the proximal tube 502) and a distal section 504c extending distally from the intermediate section 504b. The proximal section 504 a extends along a first axis 550, the intermediate section has a first bend 504d that curves toward the proximal section, followed by a second bend 504e, such that the distal section 504c extends distally from the second bend 504e, substantially perpendicularly to the first axis 550. The angle δ between the axis 550 and the axis 560 of the distal section 504c need not be exactly 90 degrees, but may be between 75 and 105 degrees. If the distal tube is formable, the distal tube may be bent to have a different shape.

Figure 18:
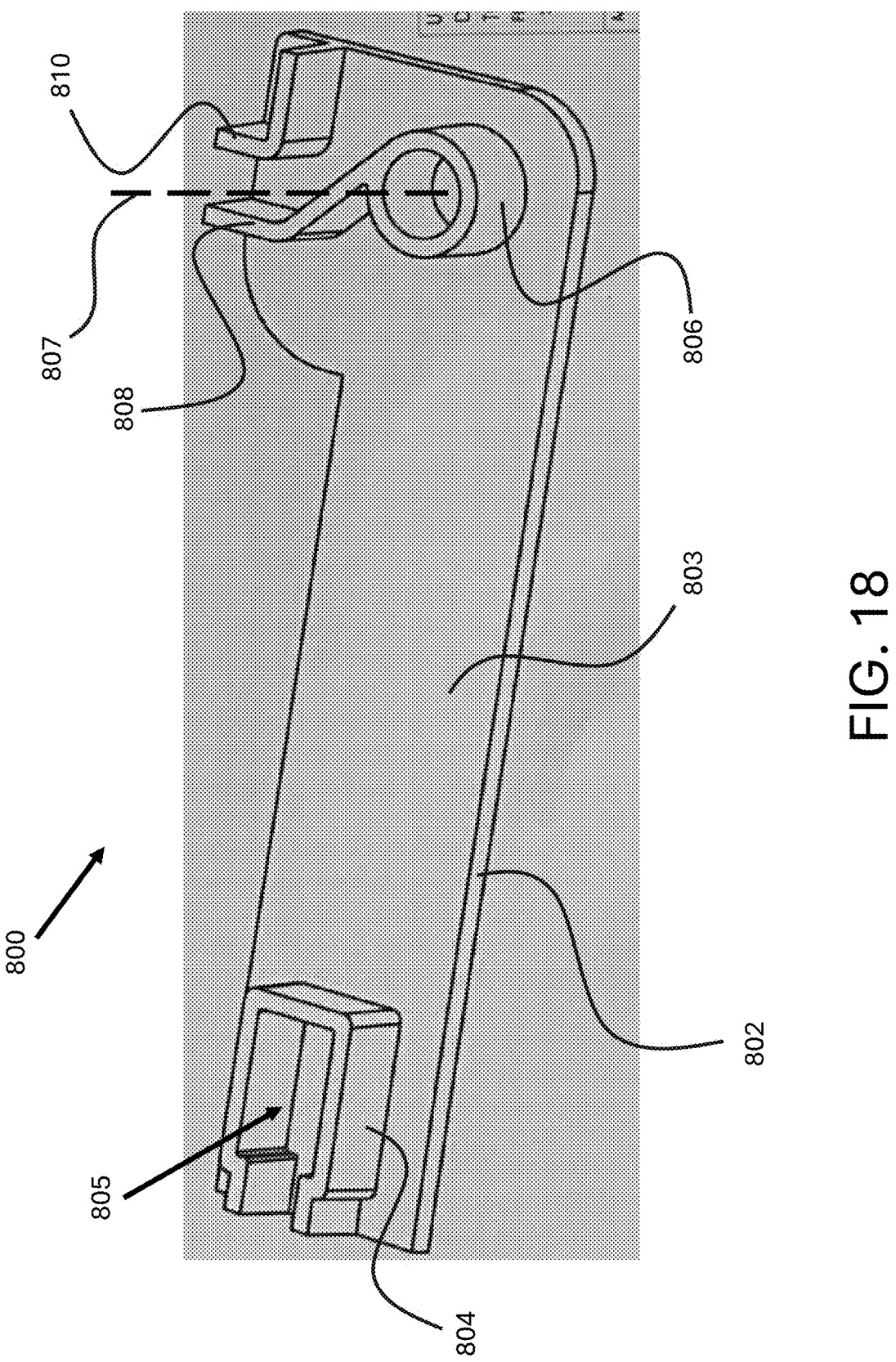
FIG. 18 is a perspective view of a bending tool, according to embodiments of the present invention.
Figures 19, 20, 21:
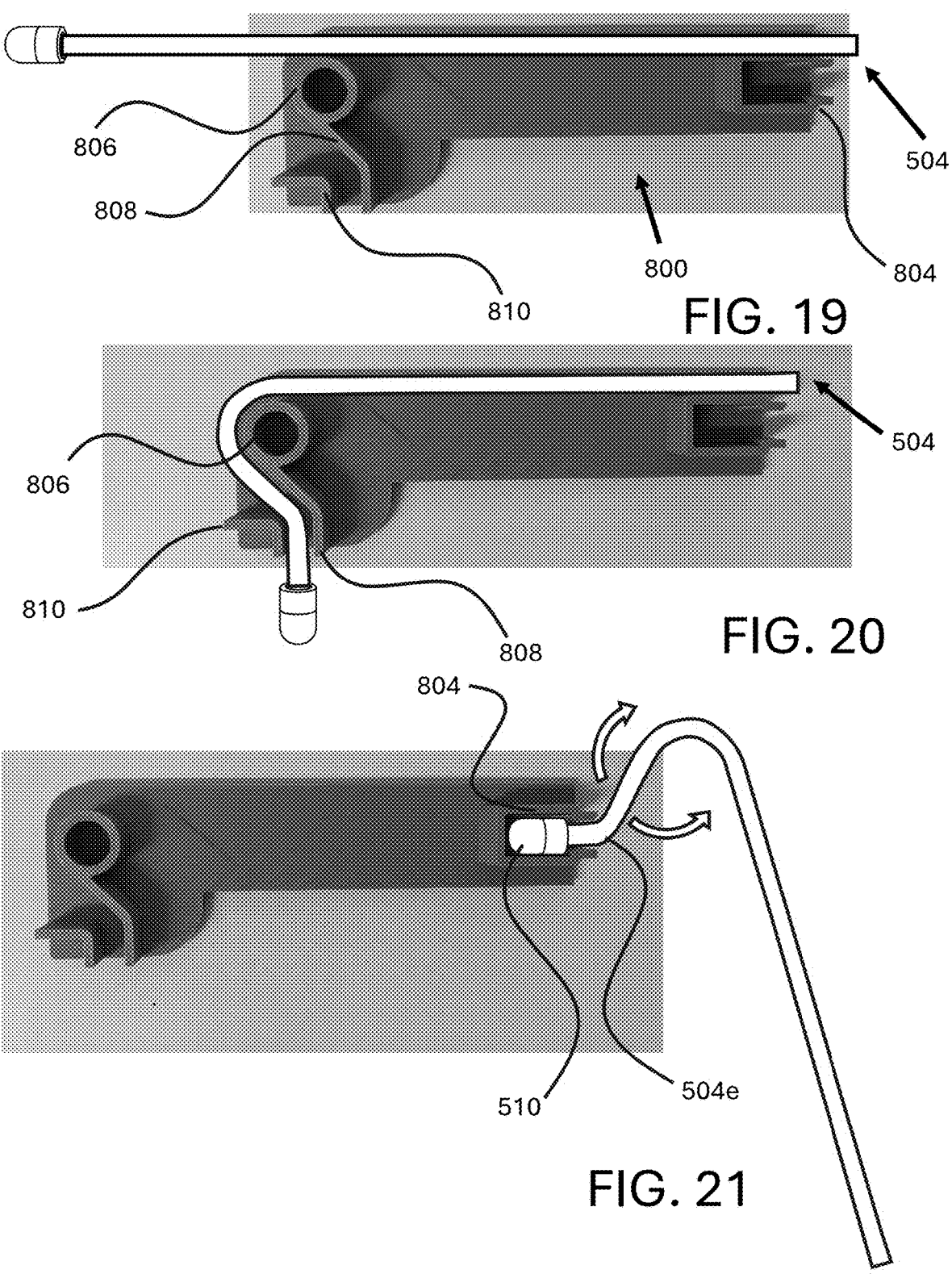
FIGS. 19-21 illustrate stages of bending a formable distal tube using the bending tool, according to a first process of some embodiments of the present invention.

FIG. 18 is a perspective view of a bending tool, according to embodiments of the present invention. FIGS. 19-21 illustrate stages of bending a formable distal tube using the bending tool, according to a first process of some embodiments of the present invention. FIGS. 22-24 illustrate stages of bending a formable distal tube using the bending tool, according to a second process of some embodiments of the present invention.

As mentioned above, at least one of the distal tubes may be formable. In some embodiments of the present invention there may be provided a bending tool 800 configured to be used for bending at least one of the distal tubes to a desired shape. In the examples of FIG. 18-21, the bending tool is configured to bend the formable distal tub 504 according to the shape described above, with reference to FIG. 25.

In some embodiments of the present invention, the bending tool 800 includes a base sheet 802, a first extension 804, a second extension 806, a third extension 808, and a fourth extension 810. The extensions 804, 806, 808, and 810 all extend perpendicularly to the base sheet 802, on a first surface 803 of the base sheet.

The first extension 804 is located at a proximal section of the base sheet 800. The second extension 806 is located distally of the first extension 804 and a curved shape curving about an axis perpendicular 807 to the first surface 803 of the base sheet 802. The third extension 808 extends laterally and proximally from the second extension 806. The fourth extension 810 is located distally from a lateral end section of the third extension 808, such that a gap is present between the third extension 808 and the fourth extension 810.

In some embodiments of the present invention, the first extension 804 has an open polygonal shape surrounding a cavity 805, the cavity being configured to receive an extractor ports while a remainder of the respective distal tubes extends outside the cavity via an opening of the polygonal shape.

Regarding the first process of FIGS. 19-21, in FIG. 19, the distal tube 504 is placed to abut a lateral side of the first extension 804 to the same lateral side of second extension 806. In FIG. 20, a portion of the distal tube 504 is bent to follow the curvature of the second extension 806, to extend along the third extension 808, and bend in a direction opposite to the first bend, to exit the gap between the third extension 808 and the fourth extension 810.

In FIG. 21, the extraction port is retained in the cavity formed inside the first extension 804. This keeps the distal portion of the distal tube fixed, while enabling movement of the remainder of the distal tube, in order to adjust the angle of the second bend 504e, if needed.

Regarding the second process of FIG. 22-24, in FIG. 22, the extraction port is retained in the cavity formed inside the first extension. This keeps the distal portion of the distal tube fixed, while enabling movement of the remainder of the distal tube, in order to achieve bend the distal portion of the distal tube by about 90 degrees.

In FIG. 23, the distal tube is placed such that the extraction port is outside the bending tool, while a portion of the distal portion of the distal tube traverses the gap between the third and fourth extension. In FIG. 24, the distal tube is bent around the second extension to extend all the way to the first extension.

Figure 32:
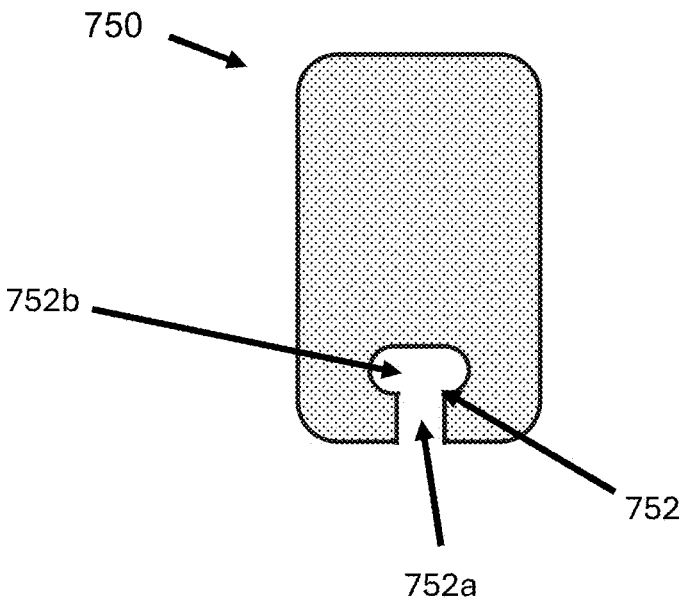
FIGS. 32 and 33 illustrate a positioning plate configured to be joined to the distal tubes for enhancing the hands-free retention of the distal ends of the distal tubes in the subject's mouth, according to some embodiments of the present invention.
Figure 33:
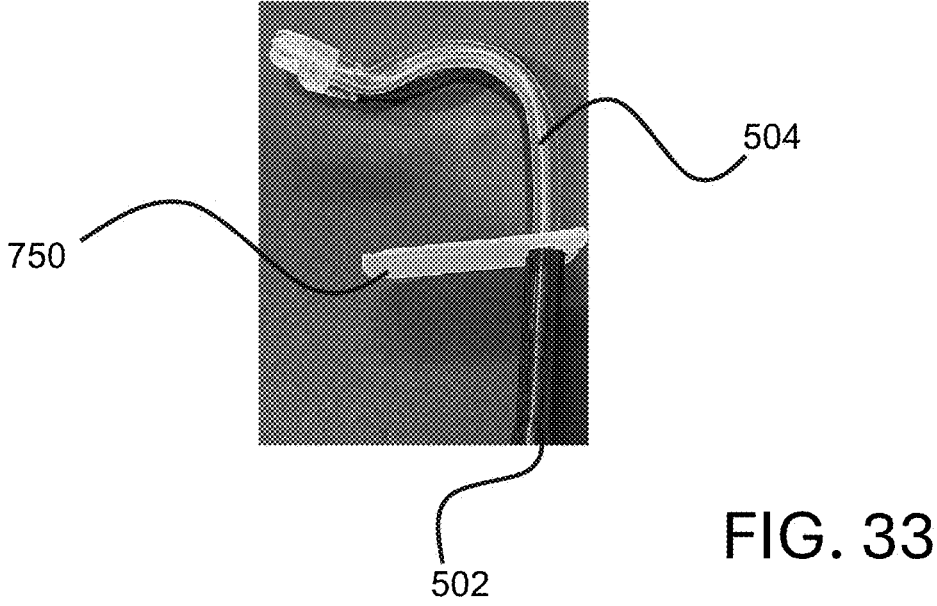

FIGS. 32 and 33 illustrate a positioning plate configured to be joined to the distal tubes for enhancing the hands-free retention of the distal ends of the distal tubes in the subject's mouth, according to some embodiments of the present invention.

Figure 25:
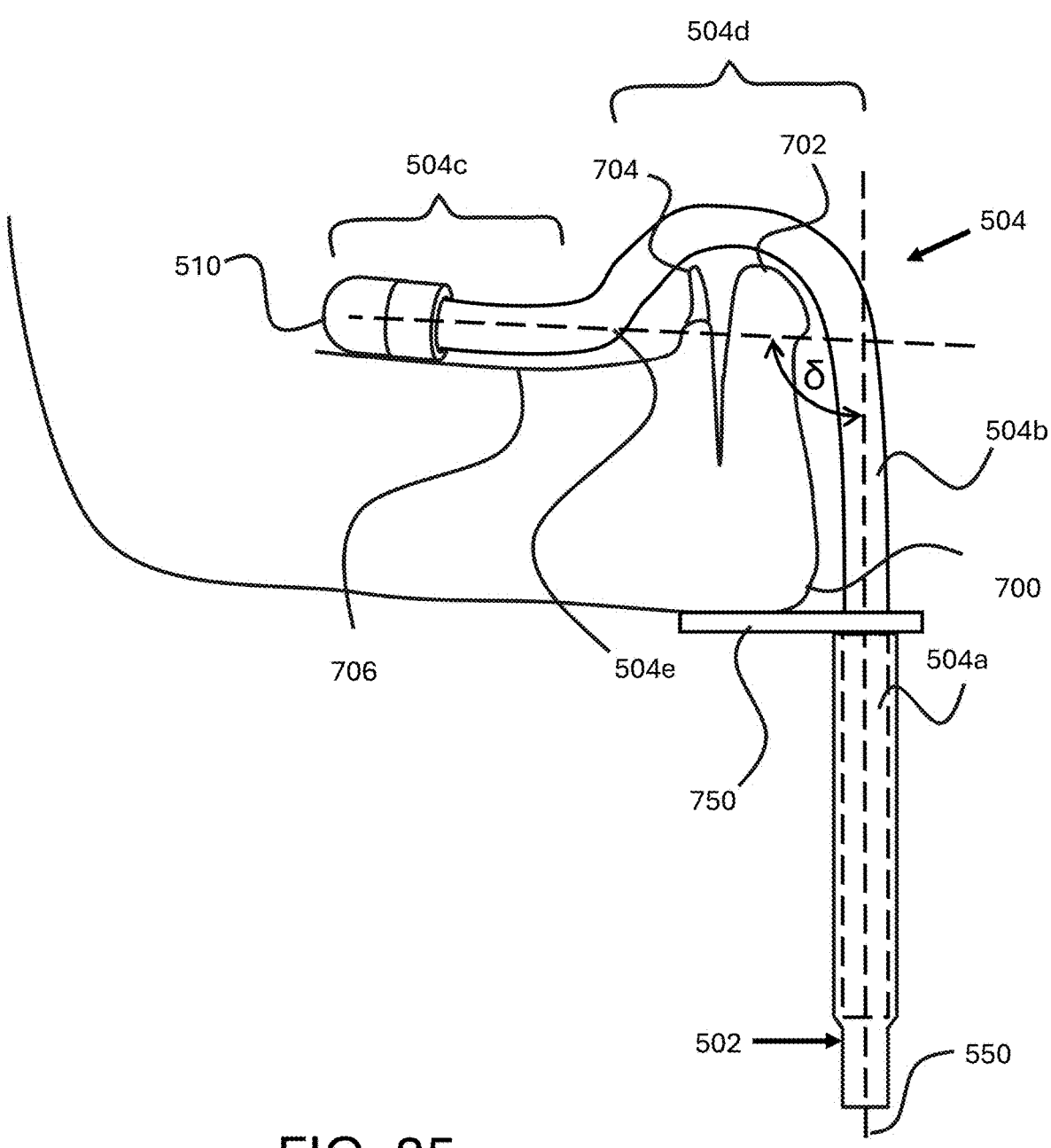
FIG. 25 illustrates a side cross section of a distal tube clearing the user's tooth line such that the extraction port in a patient's mouth, according to embodiments of the present invention.

The positioning plate 750 is configured to be removably joined to the proximal tube 502 or distal tubes 504, distally from the proximal sections of the distal tubes, when the proximal sections of distal tubes are retained in the channels of the proximal tube 502. The positioning plate is configured to contact the subject's head under the subject's jaw. In this manner—as seen in FIG. 25, the apparatus is mounted to the subject, by contact with the jaw from below (via the positioning plate) and contact with the buccal or lingual sulcus form above (via the distal section 504c of each distal tube 504. In this manner, rotation of the distal section away from the subject's sulcus is prevented or decreased. This enhances the hands-free retention of the extraction port within the subject's buccal sulcus or the lingual sulcus.

In some embodiments of the present invention, the positioning plate 750 has an opening 752 on an end thereof, for insertion of the distal tubes or of the proximal tube into the positioning plate 750 and retention of the positioning plate to the of the distal tubes or of the proximal tube. In some embodiments of the present invention, the opening is shaped so that the positioning plate 750 grasps the distal tubes or the proximal tube via interference fit.

In some embodiments of the present invention, two distal tubes are present and the proximal tube includes two channels. The opening 752 includes a longitudinal aperture 752a on an end of the positioning plate 750 and a latitudinal opening 752b connected to the longitudinal opening 752a. The longitudinal opening enables insertion of the distal tubes into the positioning plate, and the latitudinal opening configured for grasping the distal tubes by the positioning plate following insertion of the distal tubes into the longitudinal opening and a turning of the positioning plate with respect to the distal tubes. The turning may be a 90 degree turning.

Figure 34:
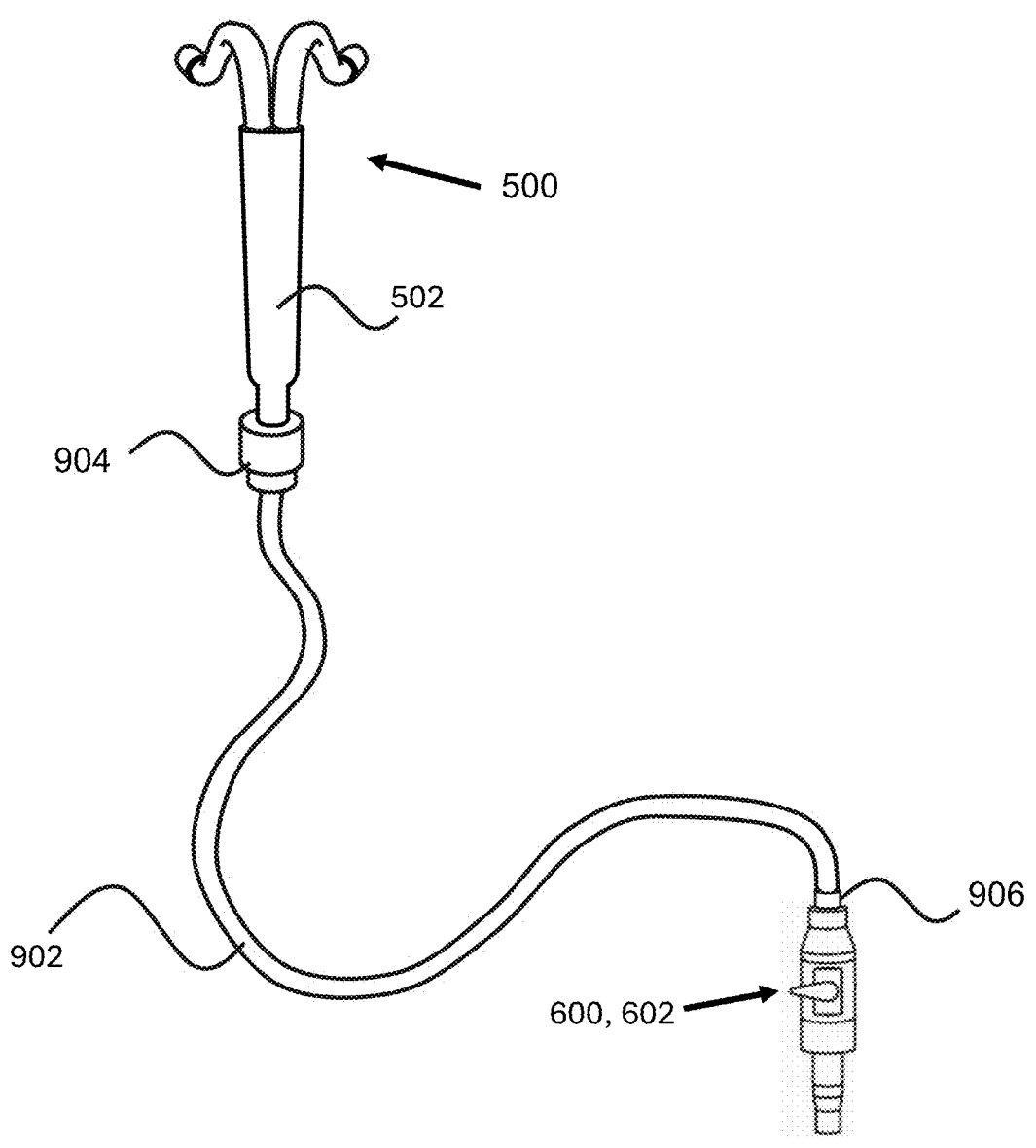
FIGS. 34-35 illustrate two embodiments of a flexible connection hose for connecting the proximal tube to the suction and waste container apparatus, according to some embodiments of the present invention.
Figure 35:
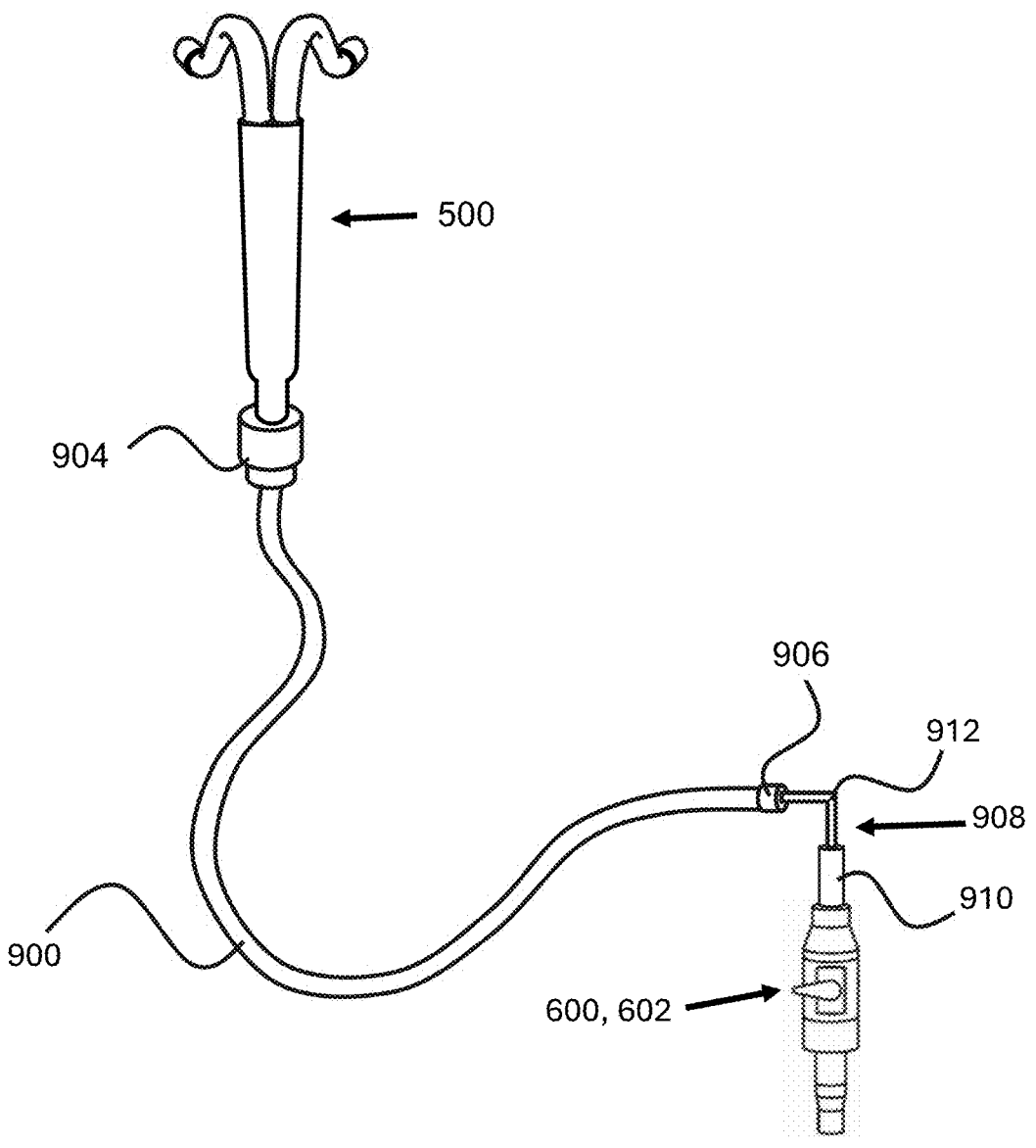

FIGS. 34-35 illustrate two embodiments of a flexible connection hose 900 for connecting the proximal tube 502 to the suction and waste container apparatus (having a connection line 600, 602), according to some embodiments of the present invention.

The flexible connection hose 900 has a first end 904 and a second end 906. The first end 904 of the connection hose 900 is configured to be joined (fixedly or removably) to the proximal portion of the proximal tube 502, while the second end 906 of the connection hose 900 is being configured to be directly or indirectly joined to connection line (600, 602) of the suction and waste container apparatus.

The connection hose 900 is lightweight and flexible, and enables fluid connection of the proximal tube 502 to the connection line (600, 602) of the suction and waste container apparatus without moving the connection line (600, 602) of the suction and waste container apparatus. The connection line (600, 602) of the suction and waste container apparatus may be difficult to move or may weigh down the apparatus, possibly causing the apparatus to move out of position when the distal portions of the distal tubes are in the subject's mouth. This is especially true for the HVE line, which has a larger cross-section (and therefore a heavier tube) and a heavier adapter. However, the connection hose 900 may be also connected to the low volume saliva ejector line. Therefore, the provision of the lightweight flexible hose enables connection of the proximal tube 502 to the connection line (600, 602) of the suction and waste container apparatus without moving the connection line (600, 602) and without compromising the positioning of the extraction ports in the subject's mouth.

In some embodiments of the present invention, the second end 906 is directly joinable to the connection line (600, 602), as seen in FIG. 34. In some embodiments of the present invention, the second end 906 is joinable to the connection line (600, 602) via a connection unit 908, as seen in FIG. 35. The connection device 908 includes a connector unit 912 configured to connect to the connection line (600, 602) and a rigid pipe 912 connecting the connector unit 912 to the second end 906 of the connection hose 900. The rigid pipe is angled or curved. Connecting the hose 900 to the connection line (600, 602) via a connection unit having a rigid curving or angled pipe prevents the formation of kinks in the hose 900, which may be formed when a flexible hose curves at or near the connection line (600, 602).

It should be noted that the rigid pipe 912 and the connector unit 910 are both hollow, so the connection of the hose 900 is in fluid communication with the connection line (600, 602).

The present invention comprises a combination of several modular components. Although certain combinations of these modular components have been described as final suction apparatus assemblies, it is understood that a suction apparatus may be formed by any combination of suitable modular components according to the principles described herein. Thus, the particular assemblies illustrated in the figures are not intended to be limiting but merely illustrative of the inventive suction assemblies.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

The invention claimed is:

1. An apparatus comprising:
   a proximal tube having a proximal portion adapted for connection to a suction and waste container apparatus, the proximal tube having at least two channels extending distally along respective longitudinal axes from the proximal portion and being in fluid communication with the proximal portion; and
   two or more formable or rigid hollow distal tubes each terminating in a porous extraction port at distal ends thereof, each of the distal tubes having a proximal section configured to be retained in a respective one of the channels of the proximal tube, wherein the two or more distal tubes are in fluid communication with the proximal portion of the proximal tube when retained in the channels of the proximal tube;
   wherein each porous extraction port is sized for placement within a buccal sulcus or a lingual sulcus of a subject, and wherein each porous extraction port comprises a central lumen in fluid communication with one of the two or more distal tubes; wherein the apparatus further comprising a bending tool configured to be used for bending at least one of the distal tubes to a desired shape, wherein the bending tool comprises: a base sheet; a first extension at a proximal section of the base sheet, the first extension extending perpendicularly to the base sheet, on a first surface of the base sheet; a second extension located distally of the first extension, the second extension extending perpendicularly to the base sheet, on the first surface of the base sheet, the second extension having a curved shape curving about an axis perpendicular to the first surface of the base sheet; a third extension extending perpendicularly to the base sheet, on the first surface of the base sheet, the third extension extending laterally and proximally from the second extension; and a fourth extension extending perpendicularly to the base sheet, on the first surface of the base sheet, the fourth extension located distally from a lateral end section of the third extension, such that a gap is present between the third extension and the fourth extension.

2. The apparatus of claim 1, wherein each of the distal tubes is configured for being rotatable about the longitudinal axis of a respective one of the channels while retained in the channel.

3. The apparatus of claim 1, wherein the distal tubes are removably joinable to the proximal tube.

4. The apparatus of claim 1, wherein the distal tubes are interference fit to the proximal tube.

5. The apparatus of claim 1, wherein:
   the longitudinal axes of the channels are parallel to each other;
   the two channels are in fluid communication latitudinally with each other, such that when the distal tubes are retained in the channels, the proximal sections of the distal tubes touch each other and press against each other.

6. The apparatus of claim 1, wherein the proximal tube is configured to connect directly to the suction and waste container apparatus.

7. The apparatus of claim 1, comprising a connector removably joined to the proximal tube to connect the proximal tube to the suction and waste container apparatus.

8. The apparatus of claim 1, wherein the distal tubes are formable.

9. The apparatus of claim 8, wherein:

at least one of the distal tubes has an intermediate section extending distally from the proximal section and a distal section extending distally from the intermediate section; and the at least one of the distal tubes is bendable such that the proximal section extends along a first axis, the intermediate section has a first bend that curves toward the proximal section, followed by a second bend, such that the distal section extends distally from the second bend substantially perpendicularly to the first axis.

10. The apparatus of claim 1, wherein the first extension has an open polygonal shape surrounding a cavity, the cavity being configured to receive any one of the extractor ports while a remainder of a respective one of the distal tubes extends outside the cavity via an opening of the polygonal shape.

11. The apparatus of claim 1, wherein:

at least one of the distal tubes is rigid;

the at least one of distal tubes has an intermediate section extending distally from the proximal section and a distal section extending distally from the intermediate section; and in the at least one distal tube, the proximal section extends along a first axis, the intermediate section has a first bend that curves toward the proximal section, followed by a second bend, such that the distal section extends distally from the second bend substantially perpendicularly to the first axis.

12. The apparatus of claim 1, comprising a flexible connection hose having a first end and a second end, the first end of the connection hose being configured to be joined to the proximal portion of the proximal tube and the second end of the connection hose being configured to be joined to the suction and waste container apparatus.

13. The apparatus of claim 1, comprising a positioning plate configured to be removably joined to the proximal tube or to the distal tubes, distally from the proximal sections of the distal tubes when the proximal sections of distal tubes are retained in the channels of the proximal tube, the positioning plate being configured to contact the subject's head under the subject's jaw when in use.

14. The apparatus of claim 13, wherein the positioning plate has an opening on an end thereof, for insertion of the distal tubes or of the proximal tube into the positioning plate and retention of the distal tube in the positioning plate.

15. The apparatus of claim 14, wherein:

the opening comprises a longitudinal aperture on an end of the positioning plate and a latitudinal opening connected to the longitudinal opening, the longitudinal opening being configured for enabling insertion of the distal tubes into the positioning plate, and the latitudinal opening configured for grasping the distal tubes by the positioning plate following insertion of the distal tubes into the longitudinal opening and a turning of the positioning plate with respect to the distal tubes.

16. An apparatus comprising:

a proximal tube having a proximal portion adapted for connection to a suction and waste container apparatus, the proximal tube having two channels extending distally along respective longitudinal axes from the proximal portion and being in fluid communication with the proximal portion; and two formable or rigid hollow distal tubes each terminating in a porous extraction port at distal ends thereof, each of the distal tubes having a proximal section configured to be retained in a respective one of the channels of the proximal tube, wherein the distal tubes are in fluid communication with the proximal portion of the proximal tube when retained in the channels of the proximal tube;

a connector removably joined to the proximal tube to connect the proximal tube to the suction and waste container apparatus;

wherein each porous extraction port is sized for placement within a buccal sulcus or a lingual sulcus of a subject, and wherein each porous extraction port comprises a central lumen in fluid communication with one of the two or more distal tubes;

wherein each of the distal tubes is configured for being rotatable about the longitudinal axis of a respective one of the channels while retained in the channel;

wherein the distal tubes are removably joinable to the proximal tube;

wherein the distal tubes are interference fit to the proximal channel;

wherein the longitudinal axes of the channels are parallel to each other;

wherein the two channels are in fluid communication latitudinally with each other, such that when the distal tubes are retained in the into the channels the proximal sections of the distal tubes touch each other and press against each other;

wherein at least one of the distal tubes has an intermediate section extending distally from the proximal section and a distal section extending distally from the intermediate section;

wherein the at least one of the distal tubes is:

(a) bendable such that the proximal section extends along a first axis, the intermediate section has a first bend that curves toward the proximal section, followed by a second bend, such that the distal section extends distally from the second bend substantially perpendicularly to the first axis; or (b) rigid and having the proximal section extending along a first axis, the intermediate section having a first bend that curves toward the proximal section, followed by a second bend, such that the distal section extends distally from the second bend substantially perpendicularly to the first axis; and the apparatus further comprising a bending tool configured to be used for bending at least one of the distal tubes to a desired shape.

17. The apparatus of claim 16, wherein the bending tool comprises:

a base sheet;

a first extension extending perpendicularly to the base sheet; on a first surface of the base sheet, the first extension having a curved shape curving about an axis perpendicular to the first surface of the base sheet;

a second extension extending perpendicularly to the base sheet; on the first surface of the base sheet, the second extension extending laterally and proximally from the first extension.

18. The apparatus of claim 16, comprising a positioning plate configured to be removably joined to the proximal tube or to the distal tubes, distally from the proximal sections of the distal tubes when the proximal sections of distal tubes are retained in the channels of the proximal tube, the positioning plate being configured to contact the subject's head under the subject's jaw when in use;

wherein the positioning plate has an opening on an end thereof, for insertion of the distal tubes or of the proximal tube into the positioning plate and retention of the distal tube in the positioning plate;

wherein the opening comprises a longitudinal aperture on an end of the positioning plate and a latitudinal opening connected to the longitudinal opening, the longitudinal opening being configured for enabling insertion of the distal tubes into the positioning plate, and the latitudinal opening configured for grasping the distal tubes by the positioning plate following insertion of the distal tubes into the longitudinal opening and a turning of the positioning plate with respect to the distal tubes.

* * * * *